United States Patent
Yoshida et al.

(10) Patent No.: US 6,937,599 B1
(45) Date of Patent: Aug. 30, 2005

(54) DATA SOURCE, DATA CONVERSION DEVICE, INVERSE DATA CONVERSION DEVICE, AUXILIARY DATA FILE GENERATION DEVICE, RECEPTION METHOD, MEDIUM AND INFORMATION AGGREGATE

(75) Inventors: Junji Yoshida, Neyagawa (JP); Chiyoko Matsumi, Suita (JP); Tatsuro Juri, Osaka (JP); Masazumi Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 760 days.

(21) Appl. No.: 09/691,298

(22) Filed: Oct. 18, 2000

(30) Foreign Application Priority Data

| Oct. 21, 1999 | (JP) | ................................ 11-300219 |
| Dec. 14, 1999 | (JP) | ................................ 11-354524 |
| Jan. 14, 2000 | (JP) | ............................ 2000-006952 |

(51) Int. Cl.[7] ...................... H04L 12/40; G06F 13/00; G06F 15/16

(52) U.S. Cl. .................. 370/390; 370/395.6; 370/432; 370/465; 709/246; 709/250; 710/107; 710/129; 725/133; 725/141

(58) Field of Search ............................... 370/428, 389, 370/390, 392, 395.1, 395.6, 395.64, 401, 370/432, 465, 466, 467; 709/201, 212, 223, 709/226, 229, 245, 246, 250; 710/33, 36, 710/52, 105, 107, 126, 129, 130; 725/109, 725/110, 131, 133, 139, 141, 151, 153

(56) References Cited

U.S. PATENT DOCUMENTS

| 5,812,204 | A | | 9/1998 | Baker et al. |
| 5,948,136 | A | * | 9/1999 | Smyers ....................... 710/107 |
| 6,038,625 | A | * | 3/2000 | Ogino et al. ................. 710/104 |
| 6,167,471 | A | * | 12/2000 | Liu et al. ....................... 710/62 |
| 6,247,069 | B1 | * | 6/2001 | Smyers ........................... 710/8 |

(Continued)

FOREIGN PATENT DOCUMENTS

| CN | 1224200 A | 7/1999 |

(Continued)

OTHER PUBLICATIONS

European Search Report for EP 00 12 2874, dated Sep. 5, 2003.

(Continued)

*Primary Examiner*—Alpus H. Hsu
(74) *Attorney, Agent, or Firm*—RatnerPrestia

(57) ABSTRACT

A data source has a data converting part for converting inputted data to predetermined data packets. A data buffer stores the data packets. A descriptor list stores a descriptor to which predetermined addresses are added, where a method of sending the data packets is described. A FIFO stores the predetermined addresses in a first-in first-out mode. A data sending part receives start instructions from the data converting part, refers to a predetermined address in which reference is not made yet in the FIFO, fetches data packets corresponding to the descriptor from the data buffer in accordance with a method of sending the descriptor indicated by the predetermined address, generates a send packet from the data packet and outputs the data packet. An end-of-send notice to the data converting part is also send when the output of the send packet is ended.

11 Claims, 23 Drawing Sheets

U.S. PATENT DOCUMENTS

| | | | |
|---|---|---|---|
| 6,452,935 B1 * | 9/2002 | Gibbs | 370/439 |
| 6,463,151 B1 * | 10/2002 | Iitsuka et al. | 380/201 |
| 6,493,769 B1 * | 12/2002 | Kawamura et al. | 710/3 |
| 6,496,862 B1 * | 12/2002 | Akatsu et al. | 709/224 |
| 6,501,441 B1 * | 12/2002 | Ludtke et al. | 345/1.1 |
| 6,505,255 B1 * | 1/2003 | Akatsu et al. | 709/239 |
| 6,584,539 B1 * | 6/2003 | James et al. | 710/314 |
| 6,631,435 B1 * | 10/2003 | Lym et al. | 710/305 |
| 6,665,020 B1 * | 12/2003 | Stahl et al. | 348/552 |
| 6,801,340 B1 | 10/2004 | Endo | |

FOREIGN PATENT DOCUMENTS

| | | |
|---|---|---|
| EP | 0 492 701 A | 7/1992 |
| EP | 0 860 823 A | 8/1998 |

OTHER PUBLICATIONS

Chinese Office Action, mailed Oct. 22, 2004 with English translation.

* cited by examiner 8 bytes

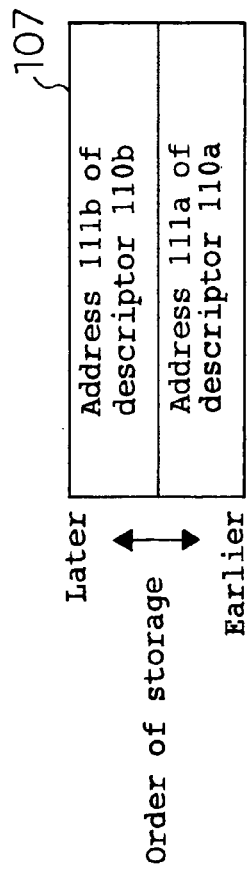
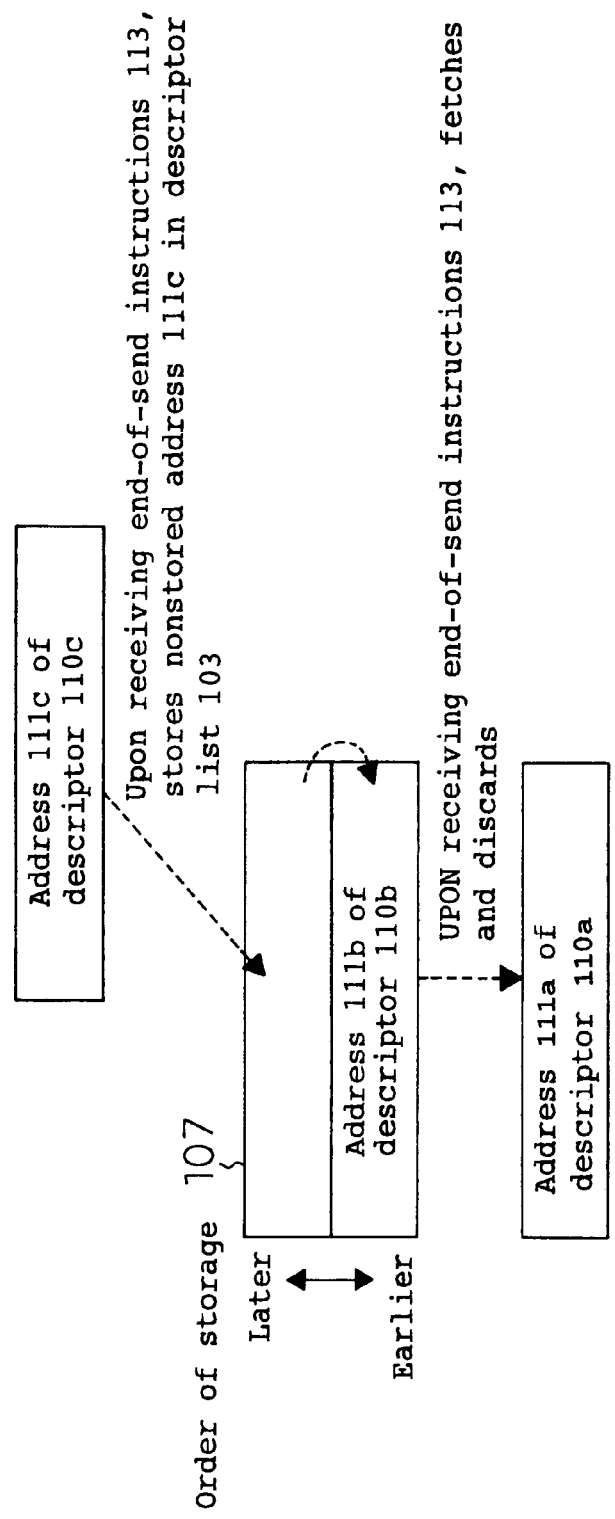
Fig. 8
Fig. 9

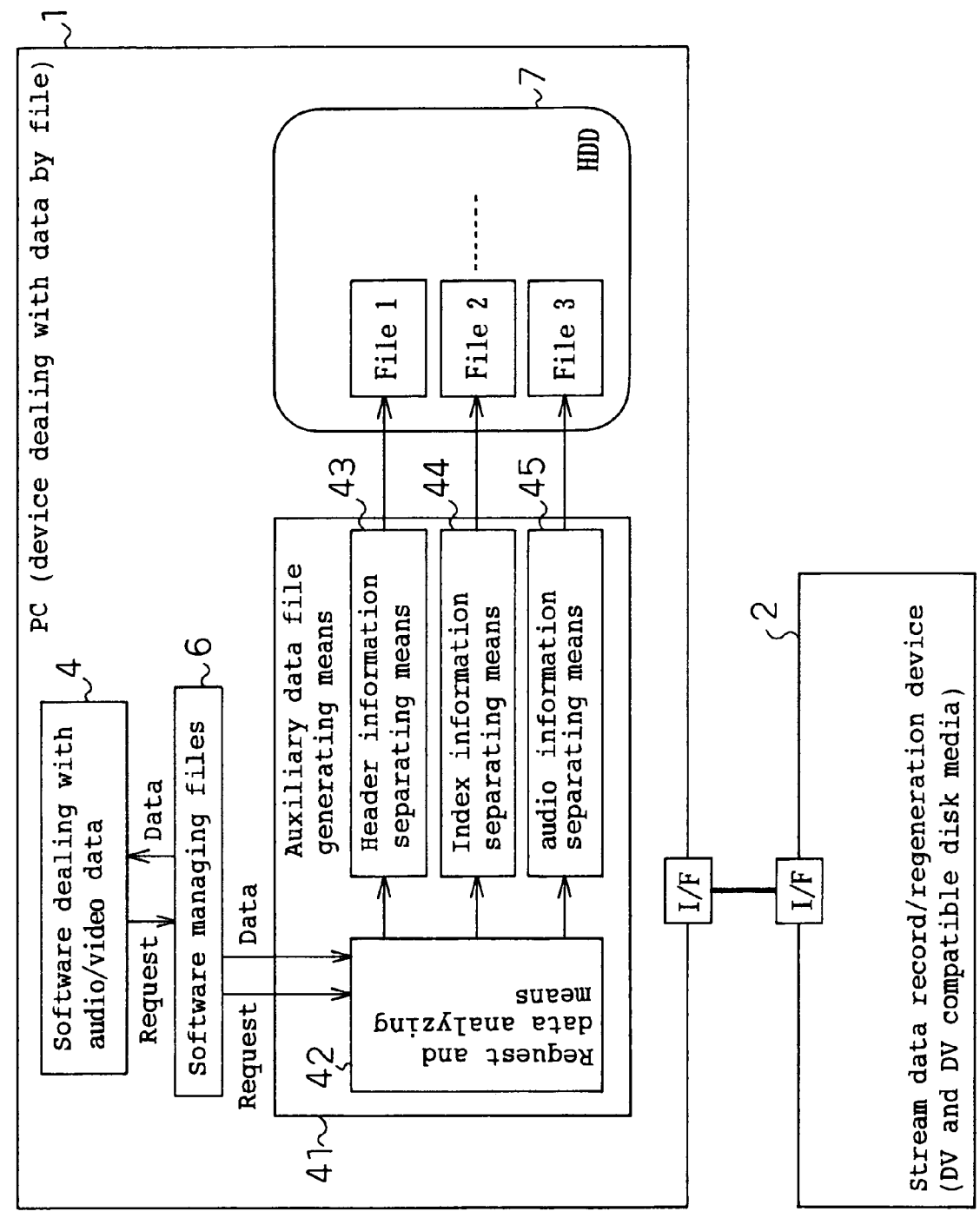

Fig. 24
PRIOR ART

|  | iPCR[0] of receiver 601 | | | oPCR[0] of transmitter 602 | | |
|---|---|---|---|---|---|---|
|  | bcc | p2p | channel number | bcc | p2p | channel number |
| Initial condition | 0 | 0 | 63 | 0 | 0 | 63 |
| FIG. 6 | 1 | 0 | 63 | 1 | 0 | 63 |
| FIG. 7 | 0 | 1 | 63 | 0 | 1 | 63 |
| FIG. 8 | 1/0 | 1 | 63 | 1 | 1 | 63 |

Fig. 25

| | bcc | p2p | channel number | Comments |
|---|---|---|---|---|
| Initial condition | 0 | 0 | 63 | |
| Start-of-regeneration of DV 702 | 1 | 0 | 63 | DV 702 allocates resources |
| Start-of-reception of PC 701 | 1 | 0 | 63 | |
| Stop-of-reception of PC 701 | 1 | 0 | 63 | |
| Stop-of-regeneration of DV 702 | 0 | 0 | 63 | DV 702 releases resources |

Fig. 26

| | bcc | p2p | channel number | Comments |
|---|---|---|---|---|
| Initial condition | 0 | 0 | 63 | |
| Start-of-regeneration of DV 702 | 1 | 0 | 63 | DV 702 allocates resources |
| Start-of-reception of PC 701 | 1 | 0 | 63 | |
| Stop-of-regeneration of DV 702 | 0 | 0 | 63 | DV 702 releases resources |
| Stop-of-reception of PC 701 | 0 | 0 | 63 | |

Fig. 27
PRIOR ART

| | bcc | p2p | channel number | Comments |
|---|---|---|---|---|
| Initial condition | 0 | 0 | 63 | |
| Start-of-reception of PC 701 | 0 | 1 | 0 | PC 701 allocates resources |
| Start-of-regeneration of DV 702 | 1 | 1 | 0 | |
| Stop-of-regeneration of DV 702 | 0 | 1 | 0 | |
| Stop-of-reception of PC 701 | 0 | 0 | 63 | PC 701 releases resources |

Fig. 28
PRIOR ART

|  | bcc | p2p | channel number | Comments |
|---|---|---|---|---|
| Initial condition | 0 | 0 | 63 |  |
| Start-of-reception of PC 701 | 0 | 1 | 0 | PC 701 allocates resources |
| Start-of-regeneration of DV 702 | 1 | 1 | 0 |  |
| Stop-of-reception of PC 701 | 1 | 0 | 63 |  |
| Stop-of-regeneration of DV 702 | 0 | 0 | 63 | DV 702 releases resources |

Fig. 29
PRIOR ART

|  | bcc | p2p | channel number | Comments |
|---|---|---|---|---|
| Initial condition | 0 | 0 | 63 | |
| Start-of-regeneration of DV 702 | 1 | 0 | 63 | DV 702 allocates resources |
| Start-of-reception of PC 701 | 1 | 1 | 63 | |
| Stop-of-reception of PC 701 | 1 | 0 | 63 | |
| Stop-of-regeneration of DV 702 | 0 | 0 | 63 | DV 702 allocates resources |

Fig. 30
PRIOR ART

|  | bcc | p2p | channel number | Comments |
|---|---|---|---|---|
| Initial condition | 0 | 0 | 63 |  |
| Start-of-regeneration of DV 702 | 1 | 0 | 63 | DV 702 allocates resources |
| Start-of-reception of PC 701 | 1 | 1 | 63 |  |
| Stop-of-regeneration of DV 702 | 0 | 1 | 63 |  |
| Stop-of-reception of PC 701 | 0 | 0 | 63 |  |

DATA SOURCE, DATA CONVERSION DEVICE, INVERSE DATA CONVERSION DEVICE, AUXILIARY DATA FILE GENERATION DEVICE, RECEPTION METHOD, MEDIUM AND INFORMATION AGGREGATE

BACKGROUND OF THE INVENTION

1. Field of the Invention

The present invention relates to a data source transmitting packet data, a device and method for processing stream data to be recorded in a record/regeneration device while making the stream data look like a file, and a reception method in a data sink on an IEEE 1394 bus.

2. Related Art of the Invention

As LSI technology improves, networks where video information and audio information are digitized and transmitted are being developed. Since video signals and audio signals should be regenerated in real time, networks enabling real time transmission are required.

As a network suitable for real time transmission like this, a network called IEEE 1394 is proposed. The IEEE 1394 is a serial high-speed bus system and is compatible with synchronous transmission, thus enabling real time transmission of data.

Currently, the IEEE 1394 is installed as an external interface in digital VCRs for use at home (hereinafter referred to as DVs) as well as many digital audio/video devices (hereinafter referred to as AV devices). As for DVs, for instance, the operation of a DV can be controlled from an external device and data can be transmitted between the external device and the DV by using the IEEE 1394.

On the other hand, also in the personal computer (hereinafter referred to as PC), the IEEE 1394 is coming into widespread use also in the world of PCs by the fact that the IEEE 1394 has been formally supported for Windows 98 of Microsoft that is virtually a standard OS as of 1999, and other OSs. Furthermore, a merger of these PCs and digital audio/video devices with DVs has been pursued.

First, as a first prior art, a data source sending data from the PC to the DV will be described using FIG. 1 to FIG. 7, FIG. 10 and FIG. 11.

FIG. 1 is one example of the data source. In FIG. 1, 101 is a data converting section, 102 is a data buffer, 103 is a descriptor list, 104 is an IEEE 1394 driver, 105 is an IEEE 1394 interface, 106 is an IEEE 1394 bus, 107 is a FIFO, 108 is input data, 109 is a CIP (Common Isochronous Packet) complying with IEC 61883 for example, 110 is a descriptor, 111 is an address on the descriptor list 103 storing the descriptor 110, 112 are start-of-send instructions, 113 is a end-of-send notice and 114 is an isochronus packet.

FIG. 2 is one example of the configuration of CIP data 109 for transmitting data. In FIG. 2, 201 is a packet data and 202 is a CIP header.

FIG. 3 is one example of the configuration of the CIP data 109 for transmitting empty data.

FIG. 4 is one example of the configuration of the isochronus packet. In FIG. 4, 401 is an isochronus header, 402 is a header CRC, and 403 is a data CRC.

FIG. 5 is one example of the configuration of the data buffer 102. In FIG. 5, 501a, 501b, 501c and 501d are frame buffers, and 502a, 502b, 503c and 504d are unsent flags. The data buffer 102 here is configured by four frame buffers.

FIG. 6 is one example of the configuration of the descriptor 110.

FIG. 7 is one example of the configuration of the descriptor list 103. In the descriptor list 103, four descriptors 110 can be stored just as the number of the frame buffers.

FIGS. 10 and FIG. 11 are one example of the configuration of the FIFO 107. In FIG. 10 and FIG. 11, the addresses of the descriptor 110, which are located at the lower hierarchy, were stored later in the FIFO 107. However, in the above described FIG. 1 to FIG. 7, FIG. 10 and FIG. 11, the input data 108 is DV data configured by a plurality of packet data 201. Also, an unsent flag 502a, an unsent flag 502b, an unsent flag 502c and an unsent flag 502d are in a "already sent" or "unsent" condition, and the initial condition is "already sent."

Operations of data sources according to prior art having a configuration as described above will be explained below.

Upon receiving the input data 108, the data converting section 101 fetches packet data 201 therefrom, adds the CIP header 202 in succession and stores it in the data buffer 102 as the CIP data 109 as shown in FIG. 2. At this time, the CIP data 109 is stored in the frame buffer 501a, in the first place.

Next, when a predetermined number of CIPs 109, for example fourteen CIPs 109 is stored in the frame buffer 501a, the data converting section 101 creates the descriptor 110a in which the method of sending the CIPs 109 stored in the frame buffer 501a, and stores it in the descriptor list 103, as shown in FIG. 6. At this time, the stored addresses 111a of the descriptor 110a in the descriptor list 103 are stored in the FIFO 107 together, and at the same time the send flag 502a belonging to the frame buffer 501a is made "unsent."

Here, as shown in FIG. 6, "the addresses of the frame buffer 501a," "the length of the CIP data 109," "the number of CIPs 109 that are stored in the frame buffer 501a," "descriptor ID" and "prior information" are stored in the descriptor 110a. The "descriptor ID" contains information for distinguishing the descriptor 110. For example, the "descriptor ID" of the descriptor 110a contains "A," and the "descriptor ID" of the descriptor 110b contains "B."

From then on, the data converting section 101 cyclically changes the frame buffer for storage in the order of frame buffer 501b→frame buffer 501c→frame buffer 501d →frame buffer 501a, storing a predetermined amount of CIPs 109 in each frame buffer. At this time, if the unsent flag 502a of the frame buffer in which the CIP data 109 is to be stored next, for example the frame buffer 501a is "unsent," the data converting section 101 does not perform operations for storage but waits until the unsent flag becomes "already sent."

Furthermore, after the data converting section 101 stores a predetermined number of CIPs 109 in the frame buffer 501d, it sends the start-of-send start instructions 112 to the IEEE 1394 driver 104 if the start-of-send start instructions 112 are not sent yet to the IEEE 1394 driver 104. At this time, the address of the descriptor 110 stored in FIFO 107 is as shown in FIG. 10.

Next, upon receiving the start-of-send instructions 112 from the data converting section 101, the IEEE 1394 driver 104 refers to the addresses of the descriptor 110a initially stored from the addresses of the descriptor 110 stored in the FIFO 107, and detects the descriptor 110a from the descriptor list 103. Then, according to the content described in the descriptor 110a, CIP s 109 are fetched in succession from the frame buffer 501a, and the isochronus packet 114 as shown in FIG. 4 is created.

Furthermore, the IEEE 1394 driver 104 outputs the created isochronus packet 114 to the IEEE 1394 bus through the IEEE 1394 interface 105.

Next, upon fetching the CIPs 109 in accordance with "the number of the CIPs 109" described in the descriptor 110 from the frame buffer 501a, the IEEE 1394 driver 104 sends the end-of-send notice 113 to the data converting section 101 together with "A" (in this case) that is "descriptor ID" of the descriptor 110a.

When the above described process is ended, then the IEEE 1394 driver 104 retrieves the FIFO 107, refers to the addresses of the descriptor 110b that it has not referred to yet, and processes the frame buffer 501b corresponding to the descriptor 110b, as in the case of the frame buffer 501a.

Upon receiving the end-of-send notice 113 from the IEEE 1394 driver 104, the data converting section 101 fetches from the FIFO the addresses of the descriptor 110 located in the lowest hierarchical layer thereof, and discards them. For example, in the case of FIG. 10, the addresses of the descriptor 110a are fetched and discarded, as shown in FIG. 11. At the same time, since "A" representing the descriptor 110a as "descriptor ID" is sent together with the end-of-send notice 113 that is sent to the data converting section 101 at this time, the data converting section 101 rewrites the unsent flag 502a corresponding to the frame buffer 501a to "already sent."

From then on, data is sent from the PC to the DV by repeating these processes.

Furthermore, in a series of the above described operations, if there is a difference between the transmission rate of the input data 108 and the transmission rate of the IEEE 1394 bus 106, empty data should be sent occasionally in order to adjust the rate. At this time, the data converting section 101 creates the CIP data 109 configured only by the CIP header 202 as shown in FIG. 3, as necessary. In this case, in the case where an immediately preceding CIP data 109 is stored in the frame buffer 501a, even if fourteen CIPs 109 are not stored in the frame buffer 501a, the descriptor 11a for the frame buffer 501a is created and is stored in the descriptor list 103, and the sent flag 501a is made "unsent" in the first place, as described above. Then, the CIP data 109 for empty data is stored in the frame buffer 501b, and the descriptor 110b describing the method of sending CIPs 109 stored together in the frame buffer 501b is created and is stored in the descriptor list 103. Following operations are carried out as in the case of sending CIPs for transmitting DV data.

Now, in the case of personal computers (referred to as PC for short), conventionally, even stream data such as video and audio are treated as files. However, when video and audio are actually recorded, devices such as VTRs for recording them as stream are generally used. To process/edit the video and audio recorded with the VTR, specialized edit equipment can be used, but they are expensive and it is difficult to add means having functions other than those originally prepared to the edit equipment. Thus, it is effective to process/edit data such as video and audio using PC' software with a PC.

Next, as a second prior art, procedures for carrying out edition with a PC will be described below using FIG. 17. Although PC is specified as an example, equipment other than a PC is similarly used. In FIG. 17, 1 is a PC, and 2 is a stream data record/regeneration device. Although a DV (digital record VTR) is specified as one example of the stream data record/regeneration device 2, the VTR maybe either analog or digital recording, and the I/F may be corresponding to analog or digital forms.

The internal portion of the PC 1 is configured by hardware, software in kernel mode that is an OS (operating system) and software in user mode that is an application. 3 is reception and data format conversion software, 4 is software dealing with audio/video data (edit software can be included as one example), 5 is data format inverse conversion and send software. 6 is software managing files, and 7 is a record/regeneration device recording/generating data that the PC 1 deals with (HDD as one example).

First, data is regenerated with the stream data record/regeneration device, and the needed part of the data that is outputted to the PC 1 is captured in the PC 1 using the reception and data format conversion software 3 that exists in the PC 1. In fact, the reception and data format conversion software 3 converts the data to a file format and writes it in the HDD 7. In fact, the reception and data format conversion software 3 instructs the software 6 managing the File to write File A, thereby writing in the HDD 7 the file converted by the reception and data format conversion software 3. Write is carried out by:

1) File-open instructions-specify the name of the File.
2) Write instructions to the opened file-designate the start-of-write position, the write data size and write data.
3) File close instructions. or repetition thereof. All data of the file is necessarily written, but the order of write and the write size are arbitrary.

Then, the software 4 dealing with audio/video data instructs the software 6 managing the File to read File A and carries out necessary processes based on the data read from the HDD 7. Usually, in order to write in the HDD 7 the result of the process as new File B, instructions to write File B are made. Furthermore, read of File A is carried out by:

1) File-open instructions-specify the name of the File.
2) Read instructions to the opened file-designate the start-of-read position, the read data size and read data.
3) File close instructions. or repetition thereof. The order of read and the read size are arbitrary.

File B generated after processing by the software 4 dealing with audio/video data is converted by the data format inverse conversion and send software 5 to the stream data and is simultaneously recorded in the stream data record/regeneration device 2.

The data format that can be recorded in the stream data record/regeneration device 2 includes, for example, a data format where video and audio that are inputted/outputted from the IEEE 1394 terminal of DV (Digital Video Cassette) defined in the IEC 61834 continue to run in real time. (Unless instructions are sent to the device, the regeneration of data starts approximately when a regeneration button is pushed, and the regeneration of data stops approximately when a stop button is pushed. The record of data starts approximately when a record button is pushed, and the record of data is stopped approximately when a stop button is pushed. If it is a file, the front-end and back-end of the file are strictly defined.)

File formats regarding video and audio that are commonly used include a File format called avi format. This places information about video and audio (such as frame rate of video, number of Frame, screen size, type of video compression, sampling frequency of audio, data rate of audio, sampling number of audio, number of audio channel) at the front-end of the file as header information, then arranges audio data and video data for each unit called Chunk, and places information indicating where each Chunk exists in the file (IndexEntry is generated for each Chunk) at the back-end of the file as index information.

Now, the IEC 61883 is standardized as a protocol for transmitting data of AV devices such as DVs and performing device control using the above described IEEE 1394.

Next, as a third prior art, the method of receiving data outputted from the DV with the PC will be described using FIG. 2, FIG. 4, FIG. 18 to FIG. 24, and FIG. 27 to FIG. 30.

FIG. 18 shows the PC and DV connected on the IEEE 1394 bus. In FIG. 18, 701 is a PC, 702 is a DV, 703 is an application, 704 is a driver for DV, 705 is an IEEE 1394 driver, 706 is an IEEE 1394 interface, 707 is a data outputting section, 708 is an oPCR[0], 709 is an IEEE 1394 interface, 710 is an IEEE 1394 bus, 711 is DV data, 109 is CIP, 714 is operation instructions, 715 is a request to the IEEE 1394 driver 705, 716 is a response to the request 715, and 717 is register data.

FIG. 2 shows an example of a configuration of the CIP data 109. In FIG. 2, 201 is packet data, and 202 is a CIP header. In the CIP header 202, a SID (source node ID) field indicating the node number of the device outputting data, and information showing what data is transmitted are described. The device that receives data can determine who is the send device by referring to the SID field, and is used when management of connections for broadcast transmission and point-to-point transmission described later is performed.

FIG. 4 is an example of a configuration of the isochronus packet. In FIG. 4, 401 is an isochronus header, 402 is a header CRC, and 403 is a data CRC. In the isochronus header 401, the channel for transmitting data is described.

FIG. 19 shows a configuration of the oPCR. As is clear from FIG. 19, in the oPCR, a broadcast connection counter, point to point connection counter, a channel number and the like are described.

FIG. 20 shows a configuration of the iPCR. As is clear from FIG. 20, also in the oPCR, a broadcast connection counter, point to point connection counter, a channel number and the like are described.

FIG. 21 is a conceptual diagram illustrating the broadcast transmission in the IEC 61883. In FIG. 21, 601 is a receiver and 602 is a transmitter.

FIG. 22 is a conceptual diagram illustrating the point to point transmission in the IEC 61883.

FIG. 23 is a conceptual diagram illustrating the condition that the broadcast transmission and the point to point transmission in the IEC 61883 are carried out simultaneously.

FIG. 24 shows one example of values of the oPCR[0] of the transmitter 602 and iPCR[0] of the receiver 601. That is, in FIG. 24, one example of the values of the oPCR[0] of the transmitter 602 and the iPCR[0] of the receiver 601 is shown for initial conditions, conditions of FIG. 21 (conditions of performing broadcast transmission), conditions of FIG. 22 (conditions of performing point to point transmission) and conditions of FIG. 23 (conditions of performing broadcast transmission and point to point transmission at the same time). This will be described later.

FIG. 27 to FIG. 30 are transition tables showing how the values in the oPCR[0] 708 are rewritten. The bcc represents the broadcast connection counter, and the p2p represents point-to-point connection counter.

First, the concept of the broadcast transmission and the point-to-point transmission in the IEC 61883 will be explained.

In the broadcast transmission, as shown in FIG. 21, the transmitter 602 only outputs data to for example a channel number 63 (hereinafter referred to as ch63), and does not care at all about which device receives the outputted data. On the other hand, the receiver 601 only sucks up the data transmitted to the ch63, and is not required to care about which device has outputted the data.

By contrast, in the point-to-point transmission, by clearly defining the sending device and the receiving device, one-to-one data transmission is performed between the transmitter 602 and the receiver 601 as shown in FIG. 22. As necessary, for example, the sending device carries out a plurality of point-to-point transmission at a time, thereby enabling one-to-many transmission.

Also, the broadcast transmission and point-to-point transmission can be performed at the same time. For example, as shown in FIG. 23, the transmitter 602 can output data to the ch63 by broadcast transmission, and at the same time carry out one-to-one transmission to the receiver 601 by point-to-point transmission.

Next, how to perform the broadcast connection and point-to-point connection in the IEC 61883 will be explained.

The transmitter 602 conforming to the IEC 61883 has the oPCR (output plug control register) as a register for control of output. Similarly, the receiver 601 conforming to the IEC 61883 has the iPCR (input plug control register) as a register for control of input. The configuration of the oPCR is as shown in FIG. 19, and the configuration of the iPCR is as shown in FIG. 20. A plurality of oPCRs and iPCRs can be had, and the Nth register is expressed as oPCR[N] or iPCR[N]. In this case, assuming that the 0th register is used, the oPCR[0] of the transmitter 602 and the iPCR[0] of the receiver 601.

First, for the initial condition, namely for the condition that no connection is established, as shown in the columns of the initial condition of FIG. 24, both the bcc and p2p of the oPCR[0] are 0, and similarly both the bcc and p2p of the iPCR[0] are 0. The channel number shall contain 63 as one example of the initial value.

In the case where the transmitter 602 performs output to a channel by broadcast transmission, 1 is assigned to the bcc of the oPCR[0]. Similarly, in the case where the receiver 601 performs input by broadcast transmission, 1 is assigned to the bcc of the iPCR[0]. That is, when the broadcast transmission is performed as shown in FIG. 21, each value of the bcc, p2p and channel number of the oPCR[0] of the transmitter 602 and the iPCR[0] of the receiver 601 is as shown in the column of FIG. 21 in FIG. 24. Of course, in order that the receiver 601 receives the data the transmitter 602 outputs, channel numbers should be same. In the case where the transmitter 602 terminates the output by broadcast transmission, the bcc of the oPCR[0] is turned back to 0. Similarly, in the case where the receiver 601 terminates the input by broadcast transmission, the bcc of the iPCR[0] is turned back to 0.

When the transmitter 602 and the receiver 601 perform transmission in a point-to-point manner, any one of the devices (it may be the transmitter 602 or the receiver 601 or a third device) adds 1 to the p2p of the oPCR[0] of the transmitter 602, and also adds 1 to the p2p of the iPCR[0] of the receiver 601 at the same time. That is, when point-to-point transmission as shown in FIG. 22 is performed, each value of the bcc, p2p, channel number of the oPCR[0] of the transmitter 602 and the iPCR[0] of the receiver 601 is as shown in the column of FIG. 21 of FIG. 24.

Here, transmission is performed with both channel numbers of the iPCR[0] of the receiver 601 and of the oPCR[0] of the transmitter 602 being 63, but the device establishing point-to-point transmission may change both channel numbers of the iPCR[0] of the receiver 601 and of the oPCR[0] of the transmitter 602 to any one of 0 to 62 to perform point-to-point transmission with other channel, if necessary.

When point-to-point transmission between the transmitter 602 and the receiver 601 is terminated, the device establishing the point-to-point connection subtracts 1 from the p2p of the oPCR[0] of the transmitter 602, and also subtracts 1 from the p2p of the iPCR[0] of the receiver 601 at the same time.

In the case where broadcast transmission and point-to-point transmission are performed at the same time, the above described operations may be carried out in a similar way when each connection is established. For example, when the transmitter 602 performs output to the ch63 in a broadcast manner and at the same time transmits data to the receiver 601 in a point-to-point manner as shown in FIG. 23, the values of the bcc and p2p of the oPCR[0] of the transmitter 602 are both 1 as shown in the column of FIG. 23 of FIG. 24. At this time, the value of the p2p of the iPCR[0] of the receiver 601 is 1. However, since the receiver 601 does not necessarily perform reception at a time in a broadcast manner, whether to make the bcc of the iPCR[0] equal 1 or not is up to the receiver 601.

Incidentally, whether it is broadcast transmission or point-to-point transmission, two resources, i.e. channel and bandwidth should be allocated in the case where transmission is performed on the IEEE 1394 bus 710. In the case of IEC 61883, the device that first established any one of connections in a channel allocates these resources, and the device that last disconnected the connection must release these resources.

Now, how data is transmitted from the DV 702 that is a transmitter to the PC 701 will be explained.

First, operations of the DV 702 will be explained.

Upon receiving start-of-regeneration instructions, the DV 702 assigns 1 to the bcc in the oPCR[0] 708. The data outputting section 707 starts outputting the DV data 711 to the IEEE 1394 interface 709. The IEEE 1394 interface 709 adds the CIP header 202 to the packet data 201 into which the received DV data 711 is split to create the CIP data 109 as shown in FIG. 2, and further adds the isochronus header 401, the header CRC 402 and the data CRC 403 to create and output the IEEE 1394 bus 710 the isochronus packet as shown in FIG. 4. The channel that is outputted at this time is dependent on the value written in the channel number of the oPCR [0] 708. In the case where the p2p equals 0, namely none of the connections is established just before the bcc is turned to 1, the IEEE 1394 interface 709 allocates the channel written in the channel number and a necessary bandwidth before starting output to the IEEE 1394 bus 710.

Upon receiving stop-of-regeneration instructions, the DV 702 turns back the bcc in the oPCR[0] 708 to 0, the data outputting portion 707 stops output to the IEEE 1394 interface 709, and the IEEE 1394 interface 709 stops output to the IEEE 1394 bus 710. At this time, when the bcc and the p2p are both 0 and none of the connections is established, the IEEE 1394 interface 709 releases the resource of the allocated channel and bandwidth.

Next, operations of the PC 701 will be described.

Upon receiving start-of-reception instructions as operation instructions 714 from the application 703, the driver 704 for DV sends a request to obtain the value of the oPCR of the DV 702 to the IEEE 1394 driver 705, as the request 715. The IEEE 1394driver 705 requests the IEEE 1394 interface 709 to send the register data 717 in the oPCR [0] 708 through the IEEE 1394 interface 706. Upon receiving a send request, the IEEE 1394 interface 709 fetches the register data 717 from the oPCR[0] 708 and sends the same to the IEEE 1394 interface 706. The IEEE 1394 driver 705 outputs the register data 717 received by the 1394 interface 706 to the driver 704 for DV, as the response 716.

The driver 704 for DV views the content of the register data 717, and if the bcc of the oPCR[0] 708 equals 1, or the p2p is 1 or larger, it sends instructions to write the data obtained by assigning the value obtained by adding 1 to the value of the p2p in the oPCR[0] 708 to the p2p of the oPCR[0] 708 in the oPCR[0] as new register data 717 to the IEEE 1394 driver 705 as the request 715. Upon receiving instructions to write the register data 717 in the oPCR[0] 708 as the request 715, the IEEE 1394 driver 705 requests the IEEE 1394 interface 709 to rewrite the register data 717 in the oPCR [0] 708 through the IEEE 1394 interface 706. Upon receiving the write request, the IEEE 1394 interface 709 writes the new register data 717 in the oPCR [0] 708 if the new register data 717 is reasonable value.

After that, the Driver 704 for DV sends instructions to start receiving data from the value indicated by the channel number in the oPCR [0] 708, for example ch63 to the IEEE 1394 driver 705 as the request 715. Upon receiving the start-of-reception unstructions as the request 715, the IEEE 1394 driver 705 starts receiving the isochronus packet being data from the ch63 on the IEEE 1394 bus 710 trough the IEEE 1394 interface 706. The IEEE 1394 driver 705 fetches the CIP data 109 from the received isochronus packet and outputs the CIP data 109 to the driver 704 for DV. The driver 704 for DV fetches the packet data 201 from the CIP data 109, creates the DV data 711 from the packet data 201, and outputs the same to the application 703.

Also, the driver 704 for DV views the content of the register data 717, and if both the bcc and p2p of the oPCTR[0] 708 are 0, it sends instructions to write the data obtained by assigning the channel that other devices does not use in the IEEE 1394 bus 710, for example ch0 to the channel number in the oPCR [0] 708, and assigning the value obtained by adding 1 to the value of the p2p in the oPCR [0] 708 to the p2p of the oPCR [0] 708 in the oPCR [0] 708 as new register data 717 to the IEEE 1394 driver 705 as the request 715. Upon receiving instructions to write the register data 717 in the oPCR [0] 708 as the request 715, the IEEE 1394 driver 705 requests the IEEE 1394 interface 709 to rewrite the register data 717 in the oPCR [0] 708 through the IEEE 1394 interface 706. Upon receiving the write request, the IEEE 1394 interface 709 writes the new register data 717 in the oPCR [0] 708 if the new register data 717 is reasonable value. At the same time, the driver 704 for DV allocates the ch0 and a necessary bandwidth that are resources of the IEEE 1394 bus 710, and then sends instructions to start receiving data from the ch0 to the IEEE 1394 driver 705 as the request 715. Upon receiving start-of-reception instructions as the request 715, the IEEE 1394 driver 705 starts receiving the isochronus packet that is data from the ch0 on the IEEE 1394 bus 710 through the IEEE 1394 interface 706. In the case where DV 702 has not outputted the data, the IEEE 1394 driver 705 waits until the data is outputted.

Following operations are similar to those in the case that the bcc of the oPCR[0] 708 equals 1.

On the other hand, upon receiving stop-of-reception instructions as the operation instructions 714 from the application 703, the driver 704 for DV sends instructions to stop receiving data from the IEEE 1394 bus 710 to the IEEE 1394 interface 706 as the request 715. Upon receiving stop-of-reception instructions, the IEEE 1394 interface 706 stops receiving data from the IEEE 1394 bus 710.

Next, upon receiving stop-of-reception instructions as the operation instructions 714 from the application 703, the driver 704 for DV sends to the IEEE 1394 driver 705 as the request 715 a request to obtain the value of the oPCR[0] 708 of the DV 702. The driver 704 for DV sends instructions to write the data obtained by assigning the value obtained by subtracting 1 from the value of the p2p in the oPCR[0] 708 to the p2p of the oPCR[0] 708 in the oPCR[0] 708 as new register data 717 to the IEEE 1394 driver 705 as the request 715. By operations similar to those described above, the value of the oPCR[0] 708 of the DV 702 is changed. If the bcc of the oPCR[0] 708 equals 0 and the driver 704 for DV allocates the resource of the IEEE 1394 bus 710 earlier, the driver 704 for DV then releases the resource of the IEEE 1394 bus 710 at the same time. At this time, if necessary, the driver 704 for DV turns the value of the channel number of the oPCR[0] 708 to the original value.

Tables of who allocates the value of the oPCR[0] 708 of the DV 702 and the resource of the IEEE 1394 bus 710, and who release the same are shown in FIG. 27 to FIG. 30 as one example.

Totally, four possible operations are assumed, considering which of start-of-regeneration of the DV 702 and start-of-reception of the PC 701 was performed earlier, and which of stop-of-regeneration of the DV 702 and stop-of-reception of the PC 701 was performed earlier.

FIG. 27 shows the case where start-of-reception of the PC 701 and stop-of-regeneration of the DV 702 are performed earlier. When the PC 701 starts reception, the bcc and p2p of the oPCR[0] 708 are both 0 because regeneration of the DV 702 has not been started yet. Thus, the PC 701 changes the channel number of the oPCR[0] 708 to ch0 and the p2p to 1, and allocates the resource of the IEEE 1394 bus 710. When the DV 702 starts regeneration, the resource is not allocated and the bcc is changed to 1 because the p2p is already 1, namely the point-to-point connection is already established.

When the DV 702 stops regeneration, the resource is not released and the bcc is turned back to 0 because the p2p is still 1, namely the point-to-point connection is being established.

When the PC 701 stops reception, the PC 701 turns the channel number of the oPCR[0] 708 back to ch63, and turns the p2p back to 0 at the same time. At this point, since the DV 702 is not regenerated, the bcc of the oPCR[0] 708 is also 0. Thus, the PC 701 releases the resource of the IEEE 1394 bus 710.

FIG. 28 shows the case where start-of-reception of the PC 701 and stop-of-reception of the PC 701 are earlier. When the PC 701 starts reception, the bcc and p2p of the oPCR[0] 708 are both 0 because regeneration of the DV 702 has not been started yet. Thus, the PC 701 changes the channel number of the oPCR[0] 708 to ch0 and the p2p to 1, and allocates the resource of the IEEE 1394 bus 710. When the DV 702 starts regeneration, the resource is not allocated and the bcc is changed to 1 because the p2p is already 1, namely the point-to-point connection is already established.

When the PC 701 stops reception, the PC 701 turns the channel number of the oPCR[0] 708 back to ch63, and also turns the p2p to 0 at the same time. At this point, since the DV 702 is still regenerating, the bcc of the oPCR[0] 708 is 1. Thus, the PC 701 does not release the resource of the IEEE 1394 bus 710.

When the DV 702 stops regeneration, the bcc is turned back to 0, but since the p2p is also already turned to 0 and none of the connections is established, the DV 702 releases the resource of the IEEE 1394 bus 710.

FIG. 29 shows the case where start-of-regeneration of the DV 102 and stop-of-reception of the PC 701 are earlier. When the DV 702 starts regeneration, the DV 702 allocates the resource and further turns the bcc to 0 because the p2p is still 0, namely point-to-point connection is not established.

When the PC 701 starts reception, regeneration of the DV 702 is already started, and the bcc of the oPCR[0] 708 is 1. Thus, the PC 701 only changes the p2p of the oPCR[0] 708 to 1, neither changing the channel number nor securing the resource of the IEEE 1394 bus 710.

When the PC 701 stops reception, the PC 701 turns the p2p of the oPCR[0] 708 back to 0. At this point, since the DV 702 is still regenerating, the bcc of the oPCR [0] 708 is 1. Thus, the PC 701 is not required to release the resource of the IEEE 1394 bus 710.

When the DV 702 stops regeneration, the bcc is turned back to 0, but since the p2p is also already turned to 0 and none of the connections is established, the DV 702 releases the resource of the IEEE 1394 bus 710.

FIG. 30 shows the case where start-of-regeneration of the DV 702 and stop-of-reception of the DV 702 are earlier. When the DV 702 starts regeneration, the DV allocates the resource and further turns the bcc to 1 because the p2p is still 0, namely point-to-point connection is not established yet.

When the PC 701 starts reception, the regeneration of the DV 702 is already started, and the bcc of the oPCR[0] 708 is 1. Thus, the PC 701 only changes the p2p of the oPCR[0] 708 to 1, neither changing the channel number nor securing the resource of the IEEE 1394 bus 710.

When the DV 702 stops regeneration, the resource is not released and the bcc is turned back to 0 because the p2p is still 1, namely the point-to-point connection is being established.

When the PC 701 stops reception, the PC 701 turns the p2p of the oPCR[0] 708 back to 0. At this point, since the DV 702 does not regenerate, the bcc of the oPCR[0] 708 is also 0. At this time, the PC 701 needs to release the resource of the IEEE 1394 bus 710, but since the IEEE 1394 driver 705 and the driver 704 for DV have characteristics that they cannot resources other than those allocated on their own, the resource cannot be released.

That is, generally, devices connected to the IEEE 1394 bus 110 such as DV 102 can release resources that other devices have allocated. By contrast, the PC 101 provided with Window 98 thereon has characteristics that they can release resources allocated on their own, but cannot release resources allocated by other devices.

As described above, in the IEC 61883, the device that first established any one of connections in a channel allocates these resources and the device that last disconnected the connection must release these resources. Therefore, the PC 701 must release the resource if complying with the IEC 61883, but the resource can not be released due to the characteristics of the PC 701.

Once the resource is not properly released, the resource can not be used again unless a bus reset is generated in the IEEE 1394 bus 710.

Operations of data sources according to the first prior art have been described above, but in the above described configuration, all the addresses of the descriptor 110 stored in the descriptor list 103 are stored in the FIFO 107. In this case, if the number of addresses of the descriptor 110 to be stored in the FIFO 107 increases, then the amount of memory in the PC used by the IEEE 1394 driver 104 also increases.

Inversely, if the number of addresses of the descriptor 110 to be stored in the FIFO 107 is decreased, namely the number of frame buffers in the data buffer 102 decreases, then a possible range of accepting the jitter of the input data 108 to be inputted in the data converting section 101 becomes narrower. In this case, if the input data 108 to be inputted in the data converting section 101 has a certain degree of delay or more, for example, the IEEE 1394 driver 104 could not send the isochronus packet 114 continuously.

That is, in a conventional data source, there is a problem (first problem) that some trade-off relationship is formed between the stability of send and the amount of memory required by the PC.

Also, in methods or devices described for the second prior art, processes by the reception and data format conversion software 3 and processes by the data format inverse conversion and send software 5 should be further executed before and after the software 4 dealing with audio/video data, which is complicated.

However, since data that is dealt with by the stream data record/regeneration device 2 is stream data and not a file format (namely, it does not have header information and index information), and in the PC 1, the software 4 dealing with audio/video data makes access to recording media including the HDD 7 in the first place in asynchronous timing as well as to arbitrary data, making a direct access to the stream data record/regeneration device 2 that generally performs record/regeneration in real time does not help obtain needed data.

In the case where the software 4 dealing with audio/video data only wants to process data recorded in the stream data record/regeneration device 2 and write the result in the HDD of the PC, and inversely, in the case where the software 4 dealing with audio/video data only wants to process the data in the HDD of the PC and write the result in the stream data record/regeneration device, it is similarly complicated, and HDD capacity is required.

Furthermore, for capturing a large amount of audio/video data (for example, more than 1 GB for five minute data) in the HDD 7, a HDD of large capacity is required. If data can be accumulated in the HDD, it is inevitably captured by the reception and data conversion software temporarily, but data should be replaced soon because the capacity of the HDD is soon exhausted, which is very complicated.

Prior arts have the above described problems.

That is, there is the problem (second problem) that procedures and devices for editing video and audio recorded in the stream data record/regeneration by PC device are complicated.

Furthermore, there is the problem (third problem) that an access cannot be made from the software editing video and audio of the PC directly to the video and audio recorded in the stream data record/regeneration device.

Furthermore, there is the problem (fourth problem) that a HDD of large capacity is required when the video and audio of the PC are edited.

Furthermore, in the conventional configuration described for the third prior art, there is the problem (fifth problem) that release of resources of the IEEE 1394 bus cannot be carried out properly and after that, these resources cannot be used if operations are performed in the order shown in FIG. 30.

SUMMARY OF THE INVENTION

Considering the above described first problem, the present invention intended to provide a data source, a medium and a information aggregate that reduce the amount of memory required by the PC while keeping the number of the frame buffer unchanged.

Considering the above described second to fourth problems, the present invention is intended to provide a data conversion device, an auxiliary data file generation device, a data inverse conversion device, a data conversion method, an auxiliary data file generation method, a data inverse conversion method, a medium and an information aggregate making it possible to make an access from the above described software dealing with video and audio data in arbitrary asynchronous timing to arbitrary data, eliminating needs to carry out very complicated processes, and not requiring performing upload/download to a HDD, i.e. not requiring a HDD of large capacity.

Considering the above described fifth problem, the present invention is intended to provide a reception method, a medium and an information aggregate making it possible to release the resource of the IEEE 1394 bus properly at every time.

One aspect of the present invention is a data source, comprising:
data converting means for converting inputted data to a predetermined data packets;
a data buffer storing said data packets;
a descriptor list storing a descriptor to which predetermined address are added, where a method of sending said data packets is described;
a FIFO storing said predetermined addresses in a first-in first-out mode; and
data sending means that upon receiving start instructions from said data converting means, refers to said predetermined address to which reference is not made yet in said FIFO, fetches data packets corresponding to said descriptor from said data buffer in accordance with a method of sending said descriptor indicated by said predetermined address, generates a send packet from said data packet and outputs the same, and sends an end-of-send notice to said data converting means when the output of said send packet is ended;
the number of said predetermined addresses to be stored in said FIFO being N (N: larger than or equal to 1 and smaller than the total number of said descriptors).

Another aspect of the present invention is the data source, wherein said data converting means newly stores predetermined addresses in said FIFO only when the number of said predetermined addresses is smaller than N; and
when N of predetermined addresses are already stored in said FIFO, waits until said end-of-send notice is received, upon receiving said end-of-send notice, fetches said predetermined address from said FIFO and discards it, and then
when there exists a non-storage descriptor not storing yet predetermined address in said FIFO on said descriptor list, stores said non-storage descriptor in said FIFO.

Still another aspect of the present invention is the data source according to $2^{nd}$ invention, wherein said data converting means, when M of said end-of send notices arrive (M is fixed or variable), fetches M of said second addresses in a batch from said FIFO and discards them.

Yet another aspect of the present invention is the data source, wherein said data sending means is an IEEE 1394 interface and said send packet is an isochronus packet in IEEE 1394.

Still yet another aspect of the present invention is the data source, wherein said data packet is a common isochronus packet in IEC 61883.

A further aspect of the present invention is a data conversion device outputting data in response to a file read request, comprising:

request analyzing means for analyzing said read request composed of at least an offset position from the front-end of said file and the size of data to be read; and selecting means for selecting and outputting predetermined data in accordance with instructions from said request analyzing means.

A still further aspect of the present invention is the data conversion device, wherein said file is an avi format file, said request analyzing means analyzes which portion of header information, index information, video data and audio data is requested, and said selecting means selects each data that is placed on a predetermined position based on the result of said request analyzing means, and rearranges the data in accordance with the avi format and outputs the same.

The $8^{th}$ invention of the present invention is the data conversion device according to $7^{th}$ invention, wherein said request analyzing means, when video data is requested, controls recording/regenerating means in which said video data is recorded so that said video data can be obtained.

The $9^{th}$ invention of the present invention is an auxiliary data file generation device generating header information of an avi format file as a header file and index information as an index file, comprising:

stream data analyzing means for analyzing stream data to be inputted and extracting information needed for generating said header information and said index information;

header information generating means for providing instructions to convert information needed for generating said header information extracted by said stream data analyzing means to a predetermined format and save the information as said header file; and index information generating means for providing instructions to convert information needed for generating said index information obtained by said stream data analyzing means to a predetermined format and save the information as said index file.

An additional aspect of the present invention is the auxiliary data file generation device, wherein said stream data analyzing means further comprises audio information generating means for analyzing stream data to be inputted to extract audio data, and providing instructions to convert said audio data extracted by said stream data analyzing means to a predetermined format and save the data as a audio data file.

A still additional aspect of the present invention is a data inverse conversion device outputting data in response to a file write request, comprising:

a buffer; and request analyzing means for providing control so that data to be recorded in a recorder from said write request composed of at least an offset position from the front-end of said file, the size of data to be written and write data is extracted and is outputted to said buffer, and the content of said buffer is outputted to said recorder when data accumulated in said buffer reaches a predetermined amount.

A yet additional aspect of the present invention is the data inverse conversion device, wherein said file is an avi format file, and said request analyzing means splits write data into header information, index information, video information and audio information, and outputs the video data and audio data to said buffer.

A still yet additional aspect of the present invention is the data inverse conversion device wherein said file is a file of avi format DV data, said buffer is configured by a first buffer and a second buffer, and said request analyzing means provides control so that audio data is outputted to said first buffer, video data is outputted to said second buffer, and when a predetermined amount of video data is accumulated in said second buffer, the audio data of said first buffer is overwritten on the audio data interleaved in the video data of said second buffer and is outputted to said recorder.

Another aspect of the present invention is an auxiliary data file generation device generating header information of a avi format file as a header file, and index information as an index file, comprising:

request analyzing means for extracting said header information and said index information from said write request composed of at least an offset position from the front-end of said file, the size of data to be written and write data;

header information separating means for providing instructions to save as said header file said header information extracted by said request analyzing means; and index information generating means for providing instructions to save as said index file said index information obtained by said request analyzing means.

Still another aspect of the present invention is the auxiliary data file generation device, wherein said request analyzing means further comprises audio information generating means for extracting audio data from said write request, and providing instructions to convert said audio data extracted by said request analyzing means to a predetermined format and save the data as a audio data file.

Still yet another aspect of the present invention is a data conversion method, wherein which portion of header information, index information, video data and audio data is requested by the read request of said file composed of at least an offset position from the front-end of an avi format file and the size of data to be read is analyzed, and each data that is placed in a predetermined position is read, and data that is rearranged to the avi format is obtained on the result of the analysis.

A further aspect of the present invention is the data conversion method, wherein when video data is requested, the recording/regenerating means in which said video data is recorded is controlled so that said video data can be obtained.

A still further aspect of the present invention is an auxiliary data file generation method, wherein stream data to be inputted is analyzed, and information needed for generating header information based on the avi format and index information based on the avi format is extracted, the information that is obtained in order to generate said header information is converted to a predetermined format and is saved as a header file, and the information that is obtained in order to generate said index information is converted to a predetermined format and is saver as an index file.

A yet further aspect the present invention is the auxiliary data file generation method according to $18^{th}$ invention, wherein stream data to be inputted is analyzed, and audio data based on the avi format is extracted, is converted to a predetermined format, and is saved as a file.

A still yet further aspect of the present invention is a data inverse conversion method, wherein the write request of said file composed of at least an offset position from the front-end of an avi format file, the size of data to be written and write data is analyzed to extract video data and audio data from said write data, said video data and said audio data are rearranged as stream data, and said stream data is outputted for each predetermined amount.

An additional aspect of the present invention is the data inverse conversion method, wherein said file is a file of avi format DV data, and the data split as audio data is overwritten on the audio data that is interleaved in the data split as video data, and is outputted, when said stream data is outputted.

A still additional aspect of the present invention is an auxiliary data file generation method, wherein the write request of said file composed of at least an offset position from the front-end of an avi format file, the size of data to be written and write data is analyzed to extract header information based on the avi format and index information based on the avi format from said write data, said header information data is saved as a header file and said index information is saved as an index file.

A yet additional aspect of the present invention is the auxiliary data file generation method wherein audio data based on the avi format is extracted from said write request, is converted to a predetermined format, and is saved as a file.

A still yet additional aspect of the present invention is a reception method, wherein in the case where a data sink conforming substantially with IEC 61883 and a data source conforming with IEC 61883 are connected to an IEEE 1394 bus, and in the case where said data sink is a personal computer having an IEEE 1394 interface and device controlling means for controlling all or part of devices connected to said IEEE 1394 bus, upon receiving start-of-reception instructions, said data sink determines whether said data source outputs output data to said IEEE 1394 bus using broadcast transmission, and in the case where said data source outputs said output data to said IEEE 1394 bus using broadcast transmission, said data sink receives said output data without establishing a point-to-point connection to said data source.

Another aspect of the present invention is the reception method, wherein said data source has an output control register, said output control register includes a flag indicating whether broadcast transmission is performed and a channel number indicating which channel said output data is outputted to, and in the case where said data sink is said personal computer, said data sink determines by reading said flag whether said data source outputs said output data to said IEEE 1394 bus using broadcast transmission, and in the case where said data source outputs said output data to said IEEE 1394 bus using broadcast transmission, said data sink receives said output data from the channel for which said channel number is described without changing said channel number.

Still another aspect of the present invention is the reception method, wherein said data source has an output control register, said output control register includes therein a flag indicating whether broadcast transmission is performed and a channel number indicating to which channel the output data is outputted, and in the case where said data sink is said personal computer, said data sink determines by reading said flag whether said data source outputs said output data to said IEEE 1394 bus using broadcast transmission, and said data sink changes said channel number to an arbitrary value N (N is a integer between 0 and 63), followed by receiving said output data from a channel whose channel number is said N.

Yet another aspect of the present invention is the reception method, wherein in the case where said data source does not output said output data to the IEEE 1394 bus, in the case where said data sink is said personal computer, after said data sink establishs a point-to-point connection to said data source, said data source starts outputting said output data to said IEEE 1394 bus, and at the same time said data sink receives said output data.

Still yet another aspect of the present invention is the reception method wherein a second data sink conforming to IEC 61883 is connected to said IEEE 1394 bus, and in the case where said data source outputs said output data to said IEEE 1394 bus under the condition that said data source is established with or establishs a point-to-point connection to said second data sink, and without using broadcast transmission, and in the case where said data sink is said personal computer, said data sink establishs a point-to-point connection to said data source, and receives said output data.

A further aspect of the present invention is the reception method wherein said data source is a digital VCR for use at home.

A still further aspect of the present invention is the reception method wherein said data source is a set top box outputting MPEG data.

of the present invention is a medium carrying a program and/or data for having all or part of functions of all or part of means of the data source, the data conversion device, the auxiliary data file generation device or the data inverse conversion device executed by the computer, wherein said medium can be processed by the computer.

A still yet further aspect of the present invention is an information aggregate, wherein said information aggregate is a program and/or data for having all or part of functions of all or part of means of the data source, the data conversion device, auxiliary data file generation device or the data inverse conversion device inventions executed by the computer.

An additional aspect of the present invention is a medium that carries a program and/or data for having all or part of operations of all or part of steps of the data conversion method, the auxiliary data file generation method, the data inverse conversion method or the reception method executed by the computer, wherein said medium can be processed by the computer.

of the present invention is an information aggregate wherein said information aggregate is a program and/or data for having all or part of operations of all or part of steps of the data conversion method, the auxiliary data file generation method, the data inverse conversion method or the reception method executed by the computer.

BRIEF DESCRIPTION OF THE DRAWINGS

FIG. 8 is a diagram illustrating an example of the configuration of a FIFO 107 in the embodiment of the present invention FIG. 9 is a diagram illustrating an example of the configuration of the FIFO 107 in the embodiment of the present invention.

FIG. 15 is a block diagram for illustrating auxiliary data file generating means 41 to aid the data inverse conversion means 31 of FIG. 14.

FIG. 24 is a diagram showing one example of values of iPCR[0] of a transmitter 602 and oPCR[0] of a receiver FIG. 25 is a diagram illustrating the transition of values the oPCR[0] 708.

FIG. 26 is a diagram illustrating the transition of values the oPCR[0] 708.

FIG. 27 is a diagram illustrating the transition of values the oPCR[0] 708.

FIG. 28 is a diagram illustrating the transition of values the oPCR[0] 708.

FIG. 29 is a diagram illustrating the transition of values the oPCR[0] 708.

FIG. 30 is a diagram illustrating the transition of values the oPCR[0] 708.

DESCRIPTION OF THE SYMBOLS

Figure 1:
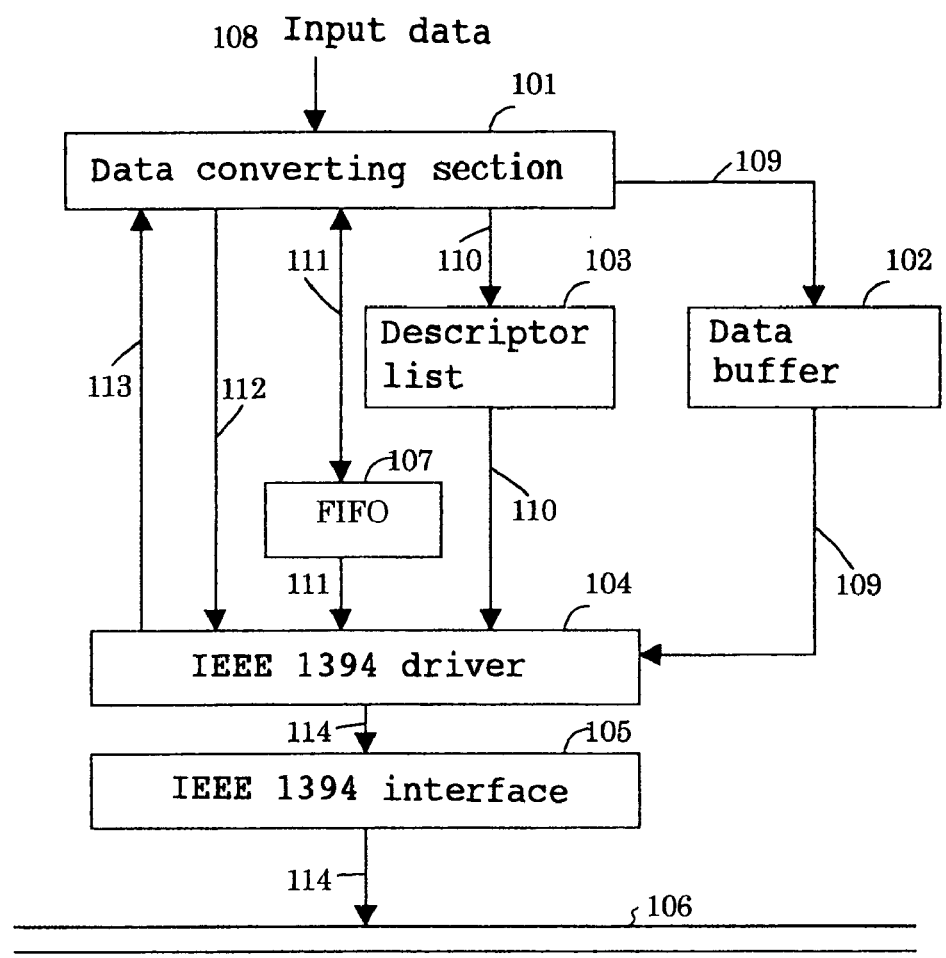
FIG. 1 is a diagram illustrating a data source in the embodiment of the present invention and the conventional example.
Figure 2:
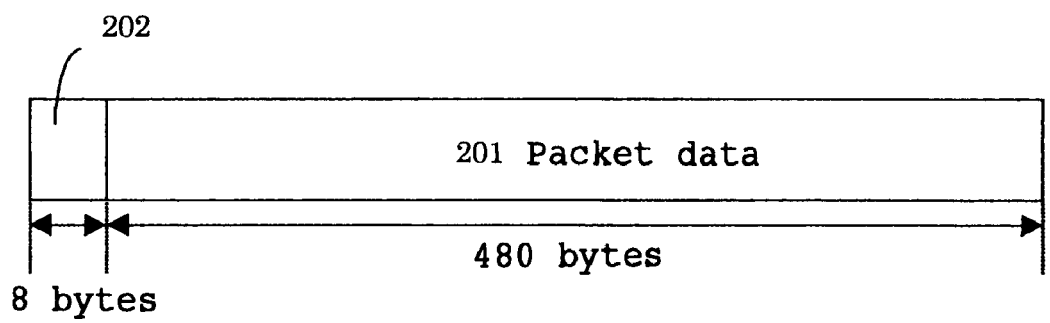
FIG. 2 is a diagram illustrating an example of the configuration of a CIP data 109.
Figure 3:
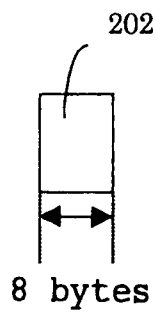
FIG. 3 is a diagram illustrating an example of the configuration of the CIP data 109 when empty data is sent.
Figure 4:
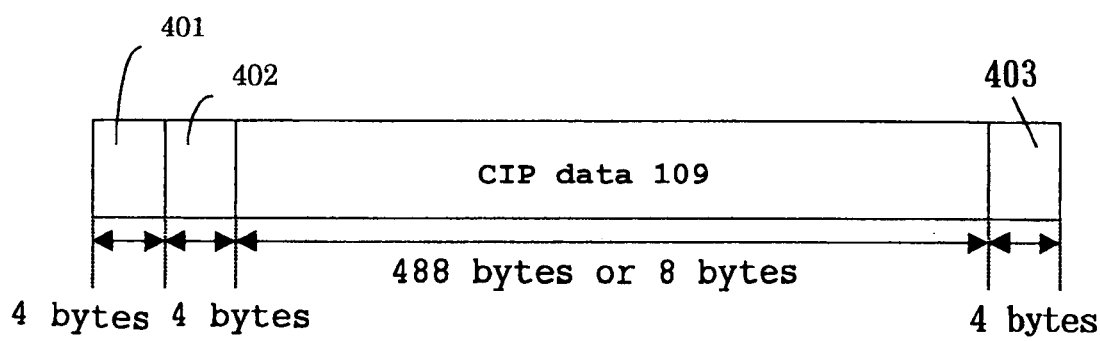
FIG. 4 is a diagram illustrating an example of the configuration of an isochronus packet.
Figure 5:
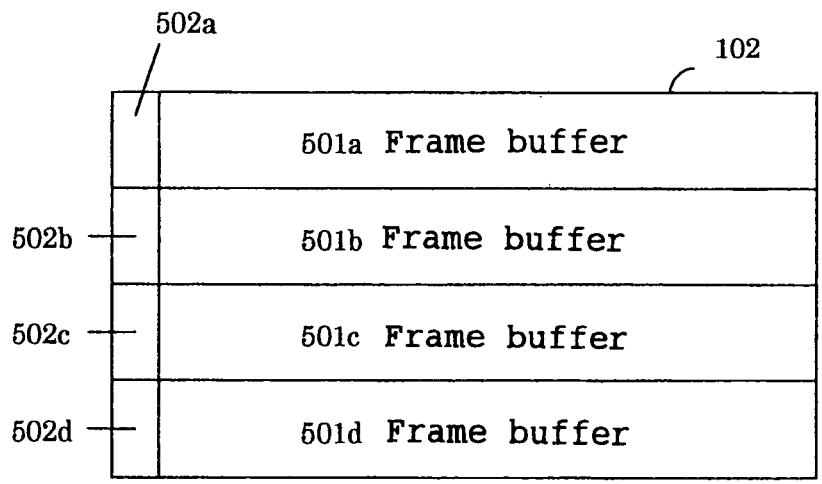
FIG. 5 is a diagram illustrating an example of the configuration of a data buffer 102.

1 PC
2 Stream data record/regeneration device
4 Software dealing with audio/video data
6 Software managing files
7 HDD
11 Data converting means
12 Request analyzing means
13 Selecting means
21 Auxiliary data file generating means
22 Stream data analyzing means
23 Header information generating means
24 Index information generating means
25 Audio information generating means
31 Data inverse converting means
32 Request and data analyzing means
33 First buffer
34 Second buffer
41 Auxiliary data file generating means
42 Request and data analyzing means
43 Header information generating means
44 Index information generating means
45 Audio information generating means
101 Data converting section
102 Data buffer
103 Descriptor list
104 IEEE 1394 driver
105 IEEE 1394 interface
106 IEEE 1394 bus
107 FIFO
108 Input data
109 CIP data
110 Descriptor
111 Addresses in which descriptors 110 are stored.
112 Start-of-send instructions
113 End-of-send notice
114 Isochronous packet
201 Packet data
202 CIP header
401 Isochronous header
402 Header CRC
403 Data CRC
501*b*, 501*c*, 501*d* Frame buffer
502*b*, 502*c*, 502*d* Unsent flag
701 PC
702 DV
703 Application
704 Driver for DV
705 IEEE 1394 driver
706 IEEE 1394 interface
707 Data outputting portion
708 oPCR[0]
709 IEEE 1394 interface
710 IEEE 1394 bus
711 DV data
712 CIP
714 Operation instructions
715 Request
716 Response
717 Register data
601 Receiver
602 Transmitter

PREFERRED EMBODIMENTS OF THE INVENTION

Embodiments of the present invention will be described below, referring to the drawings.

First Embodiment

To begin with, a first embodiment will be described using FIG. 1 to FIG. 9.

A configuration of the date source in this embodiment is similar to the first prior art, input data 108 is DV data configured by a plurality of packet data 201, and a CIP data 109 complies with IEC 61883.

FIG. 8 and FIG. 9 show one example of a FIFO 107 of a data source according to this embodiment. In FIG. 8 and FIG. 9, the addresses of a descriptor 110 which are located in the lower hierarchy of the FIFO 107, were stored later in the FIFO 107. Also, an unsent flag 502*a*, an unsent flag 502*b*, an unsent flag 502*c* and an unsent flag 502*d* are in a "already sent" or "unsent" condition, and the initial condition is set to "already sent."

Operations of the data source according to the embodiment of the present invention having the configuration as described above will be described below.

Upon receiving input data 108, a data converting section fetches packet data 201 therefrom, adds CIP headers 202 in succession, and stores the same in a data buffer 102 as the CIP data 109. At this time, the CIP data 109 is stored in a frame buffer 501*a* in the first place.

Figure 6:
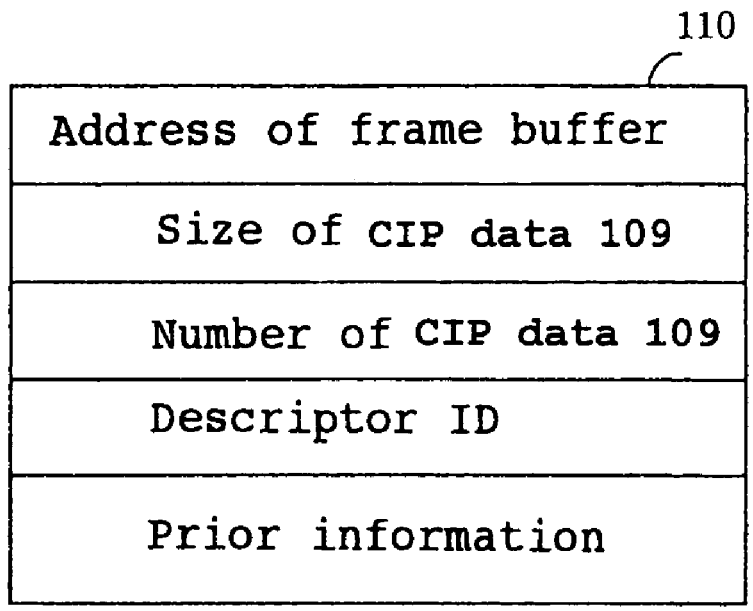
FIG. 6 is a diagram illustrating an example of the configuration of a descriptor 110.
Figure 7:
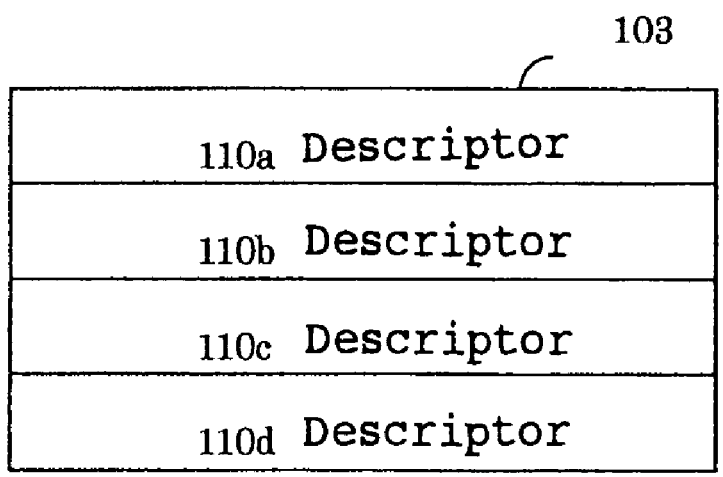
FIG. 7 is a diagram illustrating an example of the configuration of a descriptor list 103.

Next, when a predetermined number of CIPs, for example fourteen CIPs 109 are stored in the frame buffer 501*a*, the data converting section 101 creates the descriptor 110*a* in which a method of sending the CIP data 109 stored in the frame buffer 501*a* is described and stores it in the descriptor list 103 as shown in FIG. 6. At this time, stored addresses 111*a* of the descriptor 110*a* in the descriptor list 103 are stored together in the FIFO 107, and at the same time the sent flag 502*a* belonging to the frame buffer 501*a* is turned to "unsent."

From then on, the data converting section 101 changes the frame buffer for storage in the order of frame buffer 501*b*→frame buffer 501*c*→frame buffer 501*d*→frame buffer 501*a*, storing a predetermined number of CIPs 109 in each frame buffer. At this time, in the case where the unsent flag 502*a* the frame buffer in which the CIP data 109 should be stored next, for example the frame buffer 501*a* is "unsent," the data converting section 101 waits until the unsent flag is turned to "already sent" without performing operations for storage. Operations up to now are similar to conventional examples.

Figure 10:
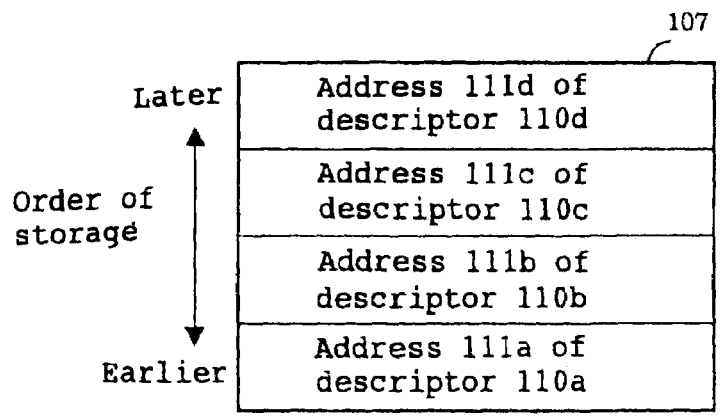
FIG. 10 is a diagram illustrating an example of the configuration of the FIFO 107 in the conventional example.
Figure 11:
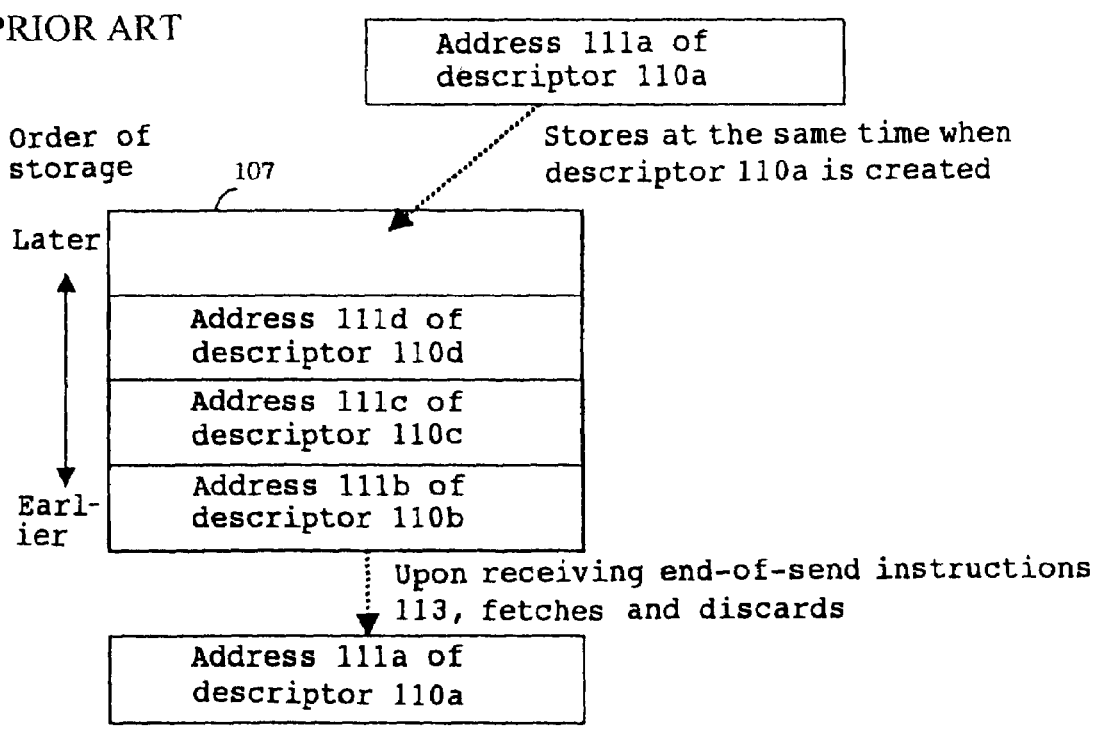
FIG. 11 is a diagram illustrating an example of the configuration of the FIFO 107 in the conventional example.

In this embodiment, in the above described condition, in the case where a predetermined number of addresses are already stored in the FIFO 107, when the descriptor 110 is newly created, it is stored in the descriptor list 103, but the addresses 111 corresponding to this descriptor list 103 are not immediately stored FIFO 107. For example, in an example shown in FIG. 10, since the address 111*a* and the address 111*b* are already stored, then the descriptor 110*c* is created and is stored in the descriptor list 103, but the stored address 111*c* of the descriptor 110*c* is not stored in the FIFO 107.

Also, after the data converting section 101 stores a predetermined number of CIPs 109 in the frame buffer 501*d*, it sends start-of-send start instructions 112 to an IEEE 1394 driver 104 if the start-of-send start instructions 112 are not sent to the IEEE 1394 driver 104.

Furthermore, upon receiving an end-of-send notice 113 from the IEEE 1394 driver 104, the data converting section 101 fetches the address 111*a* of the descriptor 110*a* from the FIFO 107 and discards the same, followed by storing the address 111*c* in the descriptor list 103, which is not stored in the FIFO 107, as shown in FIG. 9, if the FIFO 107 is in the condition as shown in FIG. 8, namely if only two addresses can be stored, for example. At the same time, since "A" representing the descriptor 110*a* as "descriptor ID" is sent together with the end-of-send notice 113 sent to the data converting section 101 at this time, the data converting section 101 rewrites the unsent flag 502*a* corresponding to the frame buffer 501*a* to "already sent."

From then on, by repeating these processes, data is sent from the PC to the DV.

In this way, according to the data source according to the embodiment of the present invention, the number of frame buffers in the data buffer 102 and the number of the descriptors 110 that can be stored in the descriptor list 103 are the same as in the case of the first prior art and they are four, but the number of the stored addresses 111 of the descriptor 110 stored in the FIFO 107 is two, thereby making it possible to reduce the PC's memory amount needed by the 1394 driver 104.

Furthermore, although the number of the frame buffers and the number of the descriptors 110 that can be stored in the descriptor list 103 have been specified as four, respectively, any number being 3 or larger may be adopted.

Furthermore, although the number of the stored addresses 111 of the descriptor 110 stored in the FIFO 107 has been specified as two, any number being 1 or larger, and smaller than the number of the descriptors 110 that can be stored in the descriptor list 103 may be adopted.

Furthermore, explanation has been presented describing the number of addresses to be discarded after send packets are sent as one each, but it may be set to M (fixed or variable amount).

Furthermore, the configuration of the descriptor 110 has been described as that shown in FIG. 6, but as long as the elements of the descriptor 110 include at least those shown in FIG. 6, any configuration may be adopted, and the alignment is not necessarily same as that shown in FIG. 6.

Furthermore, although it has been described that after the data converting section 101 stores a predetermined number of CIPs 109 in the frame buffer 501*d*, it sends the start-of-send start instructions 112 to the IEEE 1394 driver 104 if the start-of-send start instructions 112 are not sent to the IEEE 1394 driver 104, timing at which the data converting section 101 sends the start-of-send start instructions 112 to the IEEE 1394 driver 104 may be any timing other than this.

Furthermore, the input data 108 has been described as DV data configured by a plurality of packet data 201, but it may be other kinds of data configured by a plurality of packet data.

Furthermore, it has been described that the data source sends data to the IEEE 1394 bus 106 using the IEEE 1394 driver 104 and IEEE 1394 interfaces 105, but other interfaces and drivers may also be used.

Furthermore, the CIP data 109 has been described as those complying with the IEC 61883, but this may be described as other data packets.

Furthermore, data converting means of the present invention is corresponding to the converting portion 101 of this embodiment, and data sending means of the present invention is corresponding to the IEEE 1394 driver 104 of this embodiment.

Second Embodiment

Now, a second embodiment will be described.

Figure 12:
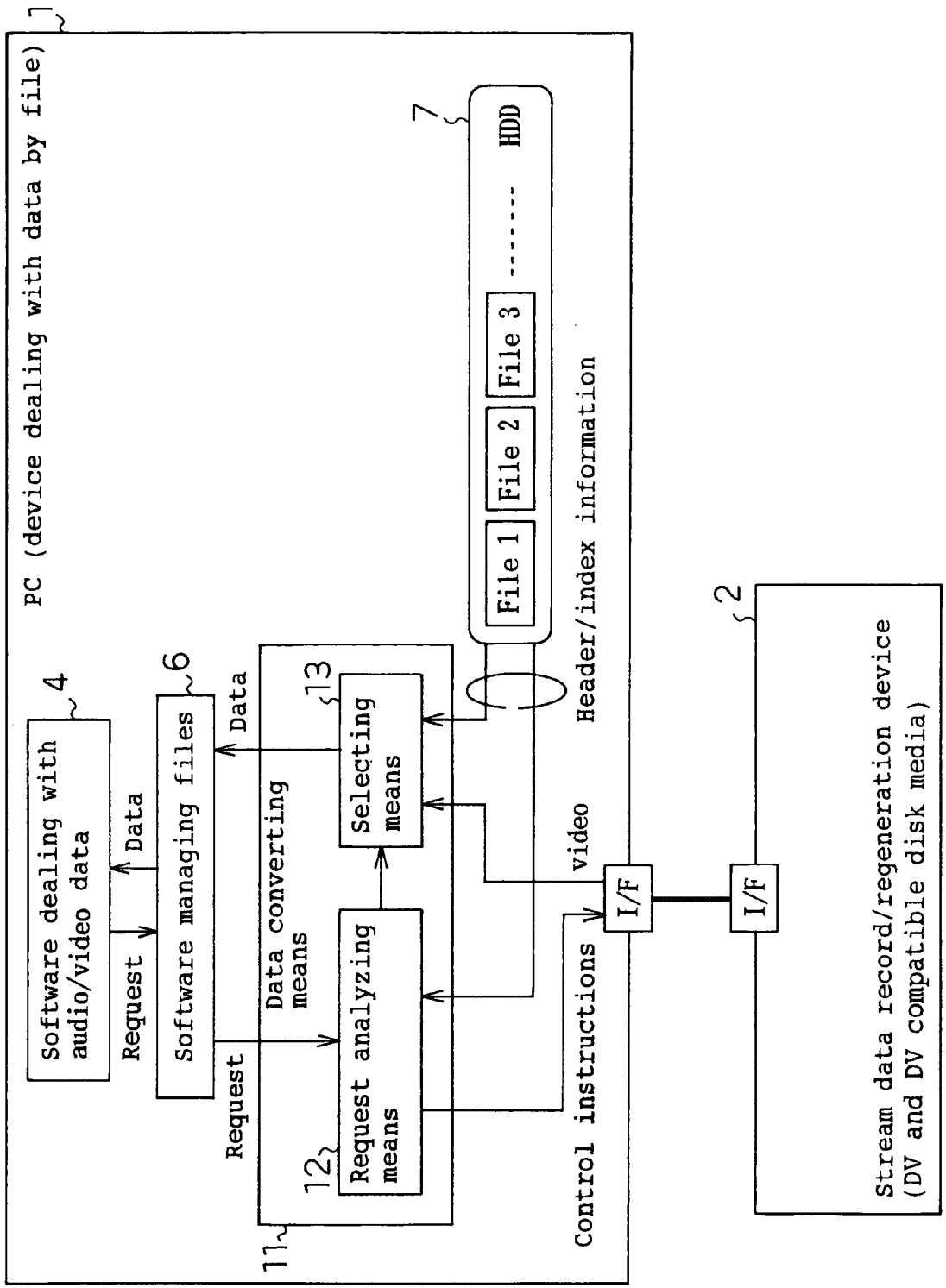
FIG. 12 is a block diagram for illustrating a data inverse conversion device of the embodiment of the present invention.

FIG. 12 is a block diagram for explaining the data conversion device of the embodiment of the present invention, and data converting means 11 shown in FIG. 12 is the date conversion device of this embodiment. In FIG. 12, 12 is request analyzing means, and 13 is selecting means.

First, upon receiving a request of data read (a position from the front-end of a file and the size of data to be read) from software 4 dealing with audio/video data via software 6 managing files, the request analyzing means 12 analyzes which portion of video data, audio data, header information and index information is requested based on header information and index information prepared as a file in the HDD 7. Also, if the video data is requested, the request analyzing means 12 controls stream data record/regeneration device 2 so that a requested portion of video data can be obtained.

The selecting means 13 outputs the header information and the index information on the HDD 7 based on the analysis by the request analyzing means 12 if the header information and the index information are requested, and outputs a requested portion of the video data obtained from the stream data record/regeneration device 2 if the video data is requested. Depending on the content of the request, these data may be combined. For the audio data, if a audio data file is prepared on the HDD 7, its data may be used, and if it is not prepared, the stream data record/regeneration device 2 is controlled so that a requested portion of the audio data can be obtained to obtain the audio data, as in the case of the video data.

In this way, the selecting means 13 converts the data obtained from the stream data record/regeneration device 2 to the data sequence that can be processed by the software 4 dealing with audio/video data and outputs the same, based on the result of analysis by the request analyzing means 12.

The data converting means 11 of the above described configuration enables the software 4 dealing with audio/video data to make an access to even stream data recorded in the stream data record/regeneration device 2 without using a HDD of large capacity by considering the data as a file, and carrying out complicated operations.

Furthermore, although it has been described that the header information and index information are in the HDD 7, they are not necessarily in the HDD 7, but they can also be developed on a memory for ensuring high speed operations.

Figure 13:
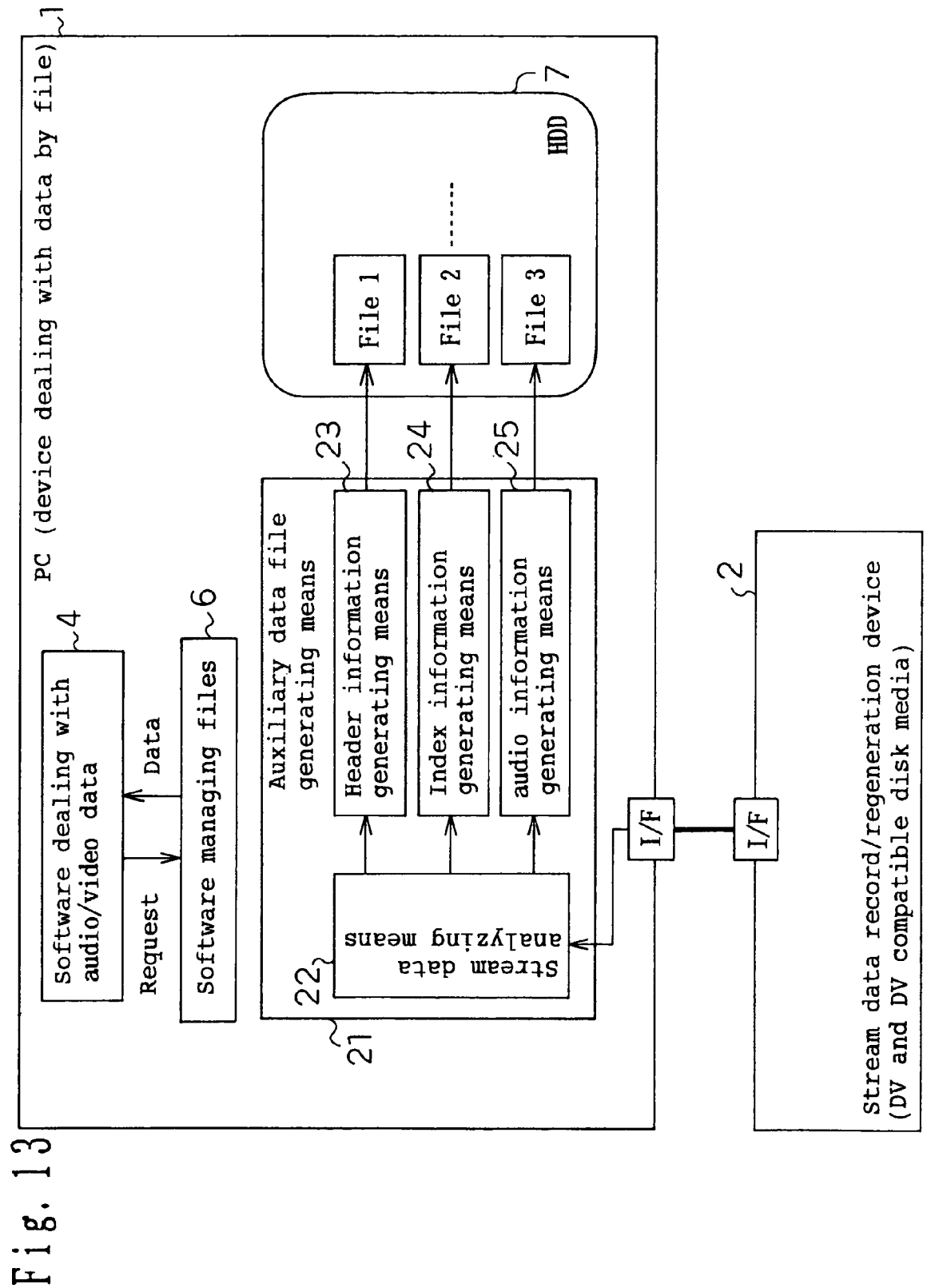
FIG. 13 is a block diagram for illustrating an auxiliary data file generation device of the embodiment of the present invention.

FIG. 13 is a block diagram for explaining an auxiliary data file generation device of the embodiment of the present invention, and the auxiliary data file generating means 21 shown in FIG. 13 is the auxiliary data file generation device of this embodiment. In FIG. 13, 22 is stream data analyzing means, 23 is header information generating means, 24 is index information generating means, and 25 is audio information generating means.

For the data conversion device of this embodiment described using FIG. 12, it has been described that the header information and index information (audio data that may be absent) that are auxiliary data exist in advance on the HDD 7 as a file, and means for generating the information will be explained.

The stream data analyzing means 22 extracts the header information from the stream data regenerated from the stream data record/regeneration device 2, and the header information generating means 23 generates a sequence in accordance with the format of the header information of the file of a format that can be processed by the software 4 dealing with audio/video data, and write the sequence in the HDD 7 as a file.

Also, the stream data analyzing means 22, assuming that the video data and audio data have been chunked from the stream data regenerated from the stream data record/regeneration device 2 in a unit of one or more flames, from the flame corresponding to the front-end of the file to the flame corresponding to the back-end of the file, investigates the size of the data of each chunk and generates index information, and the index information generating means 24 generates a data sequence in accordance with the format of the index information of the file of a format that can be processed by the software 4 dealing with audio/video data, and writes the sequence in HDD 7 as a file.

The auxiliary data file generating means 21 of the above described configuration makes it possible to generate the header information and index information that does not have data (video data) regenerated by the stream data record/regeneration device 2, but are needed for making the data look like a file.

Furthermore, the stream data analyzing means 22 may extract audio data from the data regenerated by the stream data record/regeneration device 2, and the audio information generating means 25 may converts the audio data to a sequence of the audio data in accordance with a format that can be processed by the software 4 dealing with audio/video data and write the sequence in the HDD 7 as a file. Since the audio data is larger in capacity than the header information and index information, it may be divided into files with one or more flames as a unit instead of being considered as one file.

Figure 14:
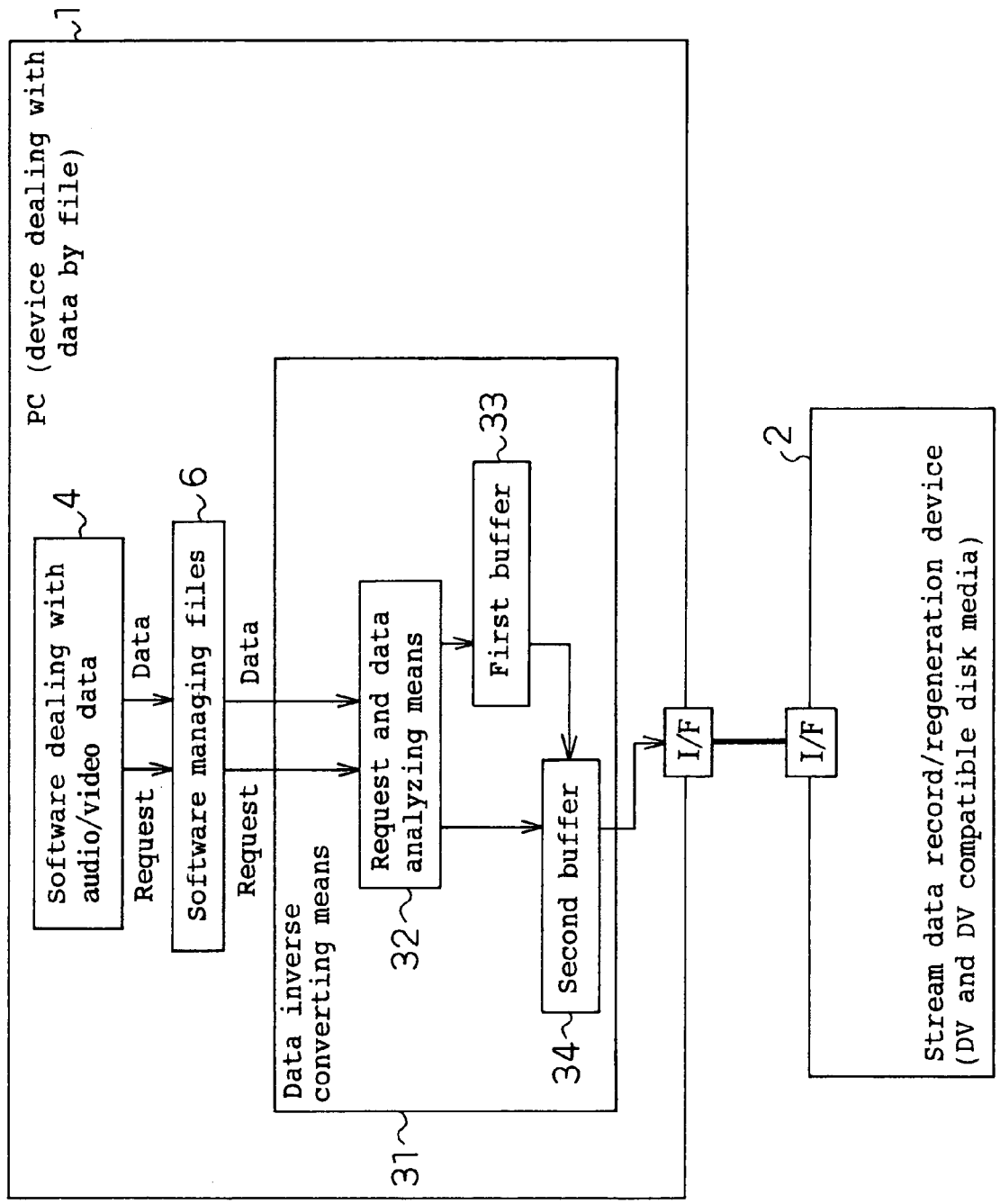
FIG. 14 is a block diagram for illustrating a data inverse conversion device of the embodiment of the present invention.

FIG. 14 is a block diagram for explaining the data inverse conversion device of the embodiment of the present invention, the data inverse converting means 31 shown in FIG. 14 is the data inverse conversion device of this embodiment. In FIG. 14, 32 is request and data analyzing means, 33 is a first buffer, and 34 is a second buffer. The data inverse converting means 31 is means that converts data processed by the software 4 dealing with audio/video data to stream data in order to record the data in a record medium of the stream data record/regeneration device 2.

First, upon receiving a data write request (a position from the front-end of the file and the size of data to be written) from the software 4 dealing with audio/video data via software 6 managing files, the request and data analyzing means 32 analyzes which portion of video data, audio data, header information and index information it is. The request and data analyzing means 32 writes the data in the first buffer 33 if it is audio data, and writes the data in the second buffer 34 if it is video data.

The request and data analyzing means 32 monitors in advance the amount of data to be written in the second buffer 34, and when a predetermined amount of data is accumulated, the request and data analyzing means 32 combines it with the part of the audio data accumulated in the first buffer 33 corresponding to the video data in the second buffer 34, and sends it to the stream data record/regeneration device 2 to record it.

The data inverse converting means 31 of the above described configuration makes it possible to record data written asynchronously in the stream data record/regeneration device 2 as stream data in real time in a file format from the software 4 dealing with audio/video data.

Furthermore, here, in the case where audio/video data is written in a file format, control is performed on a video data basis since audio data is generally written prior to video data, but similar effects can be obtained with a configuration in which control is performed on a audio data basis.

In the case of file based on a DV (Digital Video Cassette) format, in which audio data is inserted into a part of video data, and in an avi file format, this part of audio data is ignored. Thus, when data is actually sent to the stream data record/regeneration device 2 and is recorded, the audio data ordered to be written by the software 4 dealing with audio/video data can be accurately recorded, by overwriting the audio data of the first buffer 33 on the audio data in the video data of the second buffer 34.

FIG. 15 is a block diagram showing the auxiliary data file generating means 41 of the embodiment of the present invention, 42 is the request and data analyzing means, 43 is the header information generating means, 44 is the index information generating means, and 45 is the audio information generating means.

In the above described embodiment explained using FIG. 14, the video data and audio data can be recorded in the stream data record/regeneration device 2, but when the software 4 dealing with audio/video data intends to read the same file again, the data converting means 11 shown in FIG. 12 needs to generate the file as explained with the second embodiment, if the header information and index information (and audio data that may be absent) exist in advance on the HDD 7 as a file.

If the auxiliary data file generating means 41 generates the header information and index information (and audio data) as a file in advance from the data ordered to be written when the software 4 dealing with audio/video data records the data in the stream data regeneration record device 2, the effort of generating them in away described with the second embodiment could be omitted, which will be explained below.

The part of data determined as header information in the analysis by the request and data analyzing means 42 is written directly in the HDD 7 by header information separating means 43. For an avi format file, it can be considered as header information if a position from the front-end of the file (=OFFSET) is 0 in the request from the software 4 dealing with audio/video data via the software 6 managing the File, because the header information is placed in the front-end of the file. Further, since the format of the header information takes on a structure in which the mark indicating contents, the size of data and actual data are written consecutively, the size of the header information can easily be detected.

The part of data determined as index information in the analysis by the request and data analyzing means 42 is written directly in the HDD 7 by index information separating means 44. For the avi format file, the position of the front-end of the index can be calculated because size information of the entire data section (this part may be included in the header information) is recorded in the front-end of the audio/video data following the header information. Since size information of IndexEntry is written in the front-end portion of the index, and size information of the entire file is written in the front-end of the header, the size of the index information can easily be detected.

At this time, configuration can be modified for easy processes when IndexEntry is read from the stream data record/generation device 2. If the file size and the size of IndexEntry are changed due to modification, it is necessary to update the corresponding information of header information and index information at the same time.

The auxiliary data file generating means 41 of the configuration described above makes it possible to generate the header information and index information required for making the stream data regenerated by the stream data record/regeneration device 2 look like a file.

Furthermore, the request and data analyzing means 42 may extract the audio data from the software 4 dealing with audio/video data, and write the audio data in the HDD 7 as a file in a format that can be processed by the software 4 dealing with audio/video data. Since the audio data is larger in capacity than the header information and index information, it may be divided into files with one or more flames as a unit instead of being considered as one file. Since chunk ID to identify audio data and video data for each chunk and the size information of chunk are added also to the data section, audio data can easily be detected.

Figure 16A:
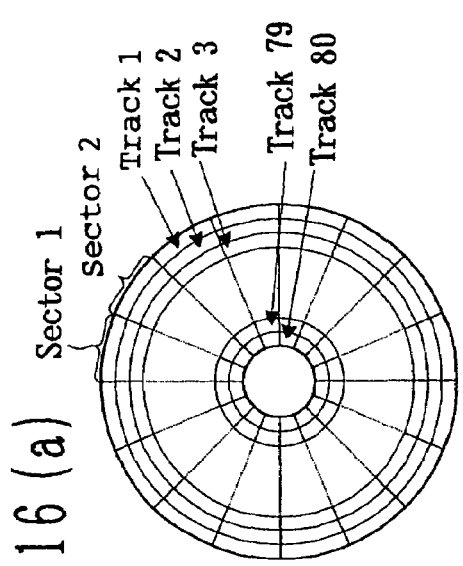
FIG. 16 is an explanatory diagram of implementation by a program.
Figure 16C:
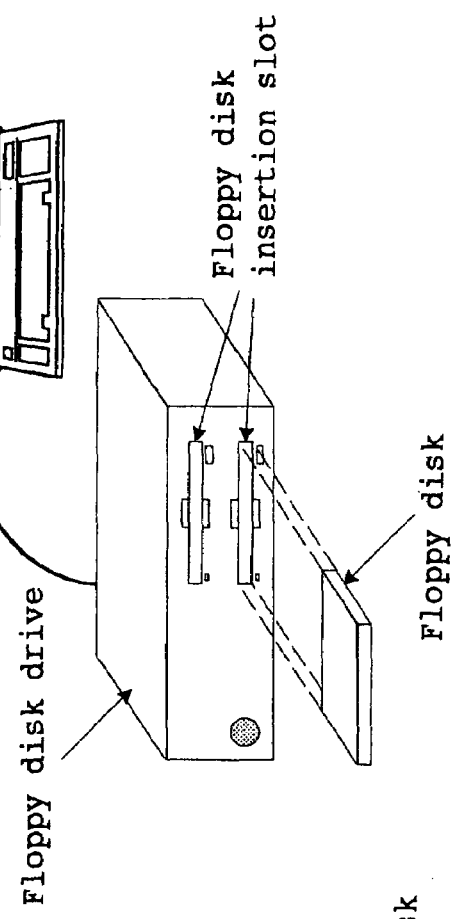
Figure 16B:
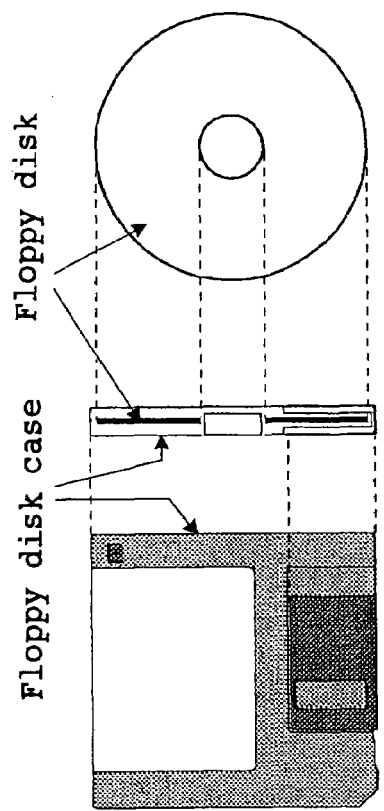
Figure 17:
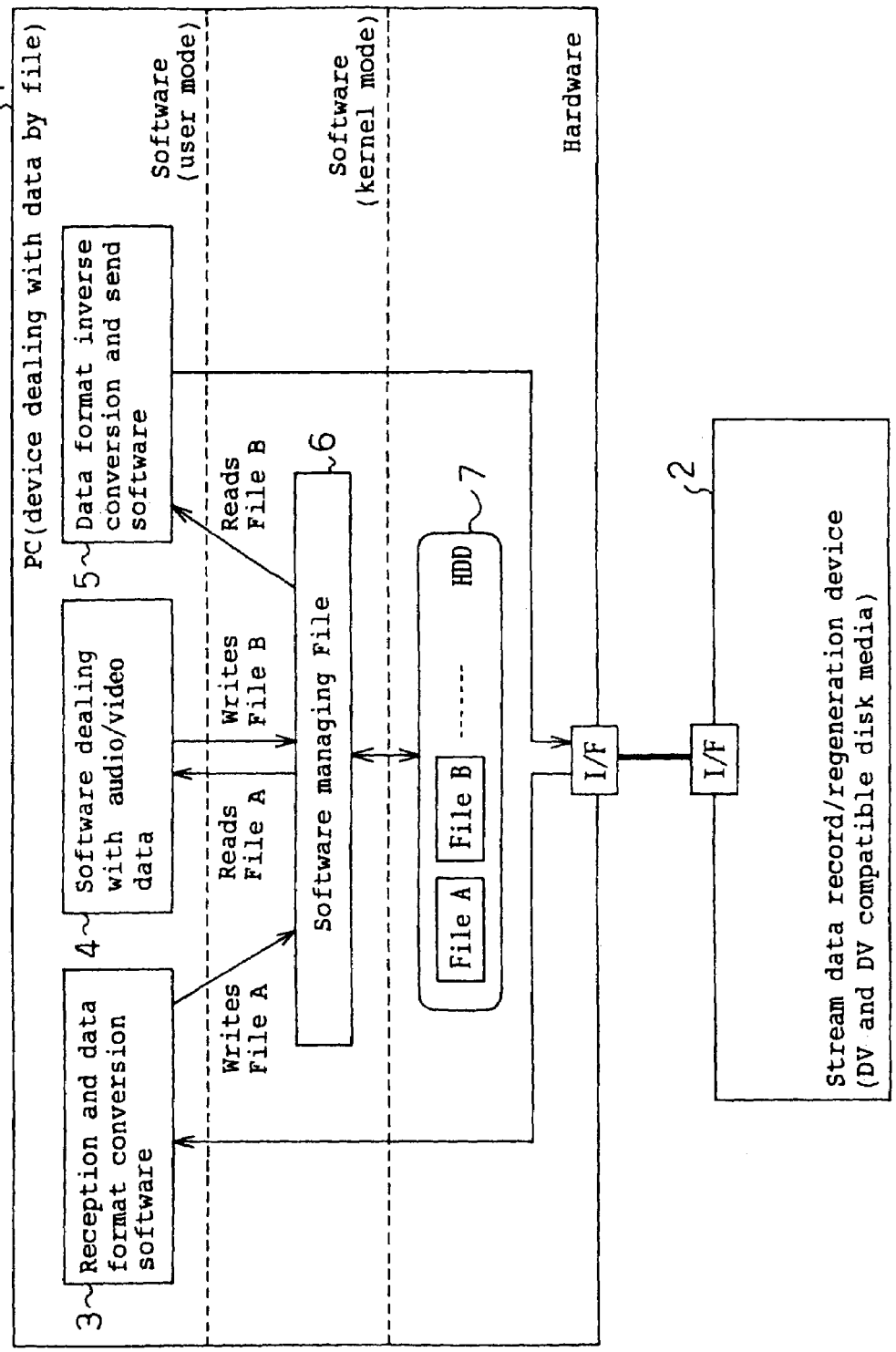
FIG. 17 is an explanatory diagram of a process for dealing with conventional stream data as a file.
Figure 18:
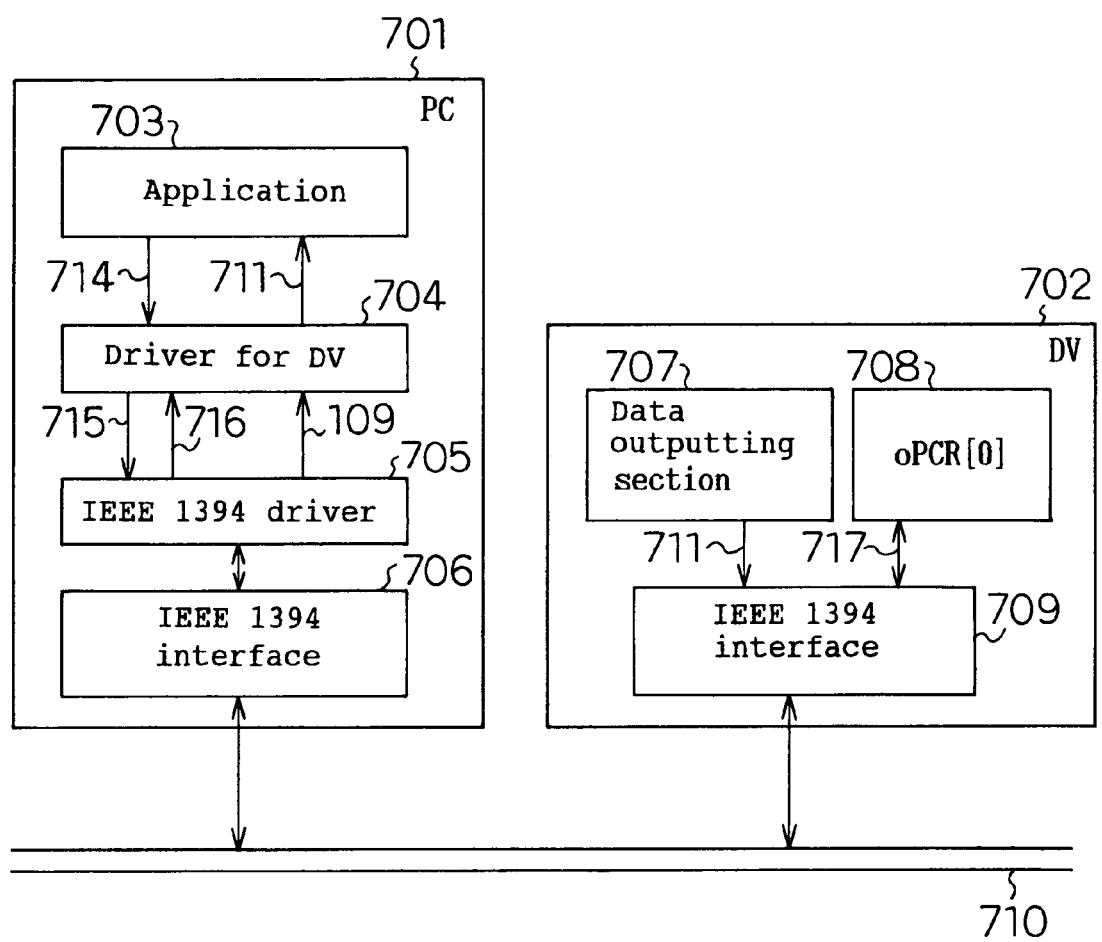
FIG. 18 is a diagram illustrating the embodiment of the present invention and the data source and data sink in the conventional example.
Figure 19:
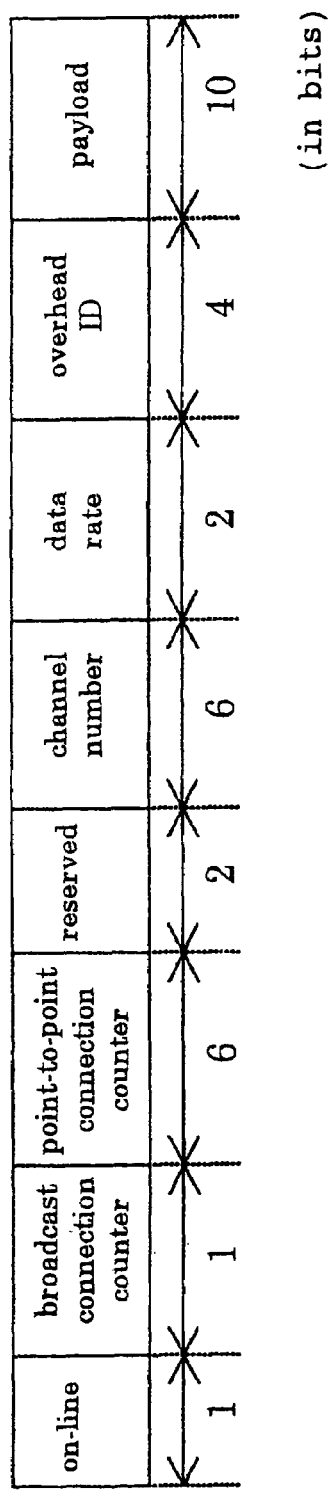
FIG. 19 is a diagram of the configuration of oPCR.
Figure 20:
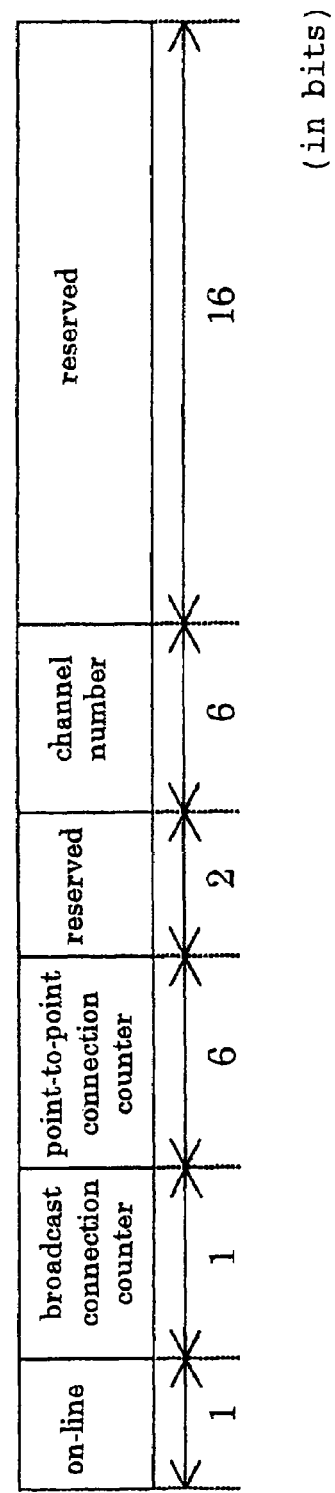
FIG. 20 is a diagram of the configuration of iPCR.
Figure 21:
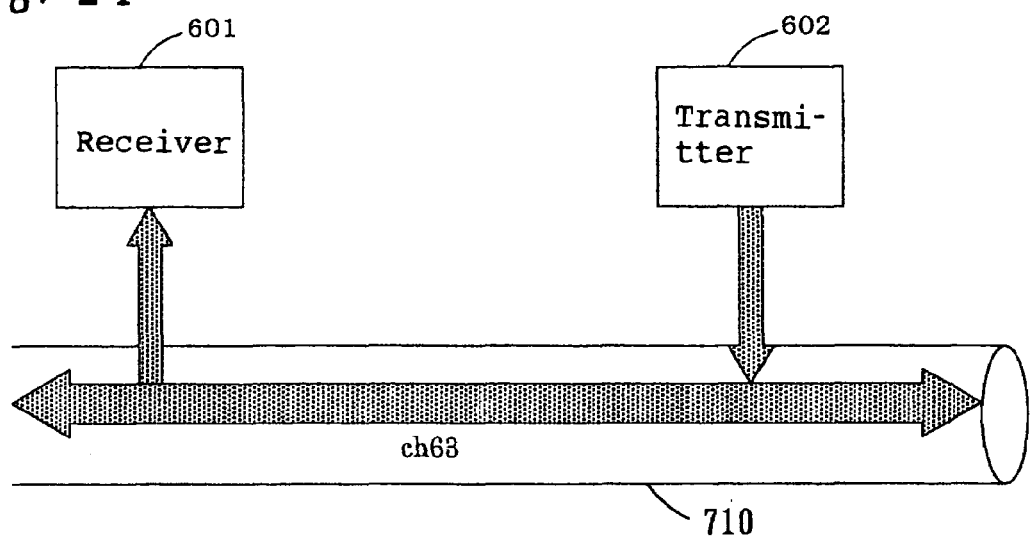
FIG. 21 is a conceptual view of broadcast transmission in the IEC 61883.
Figure 22:
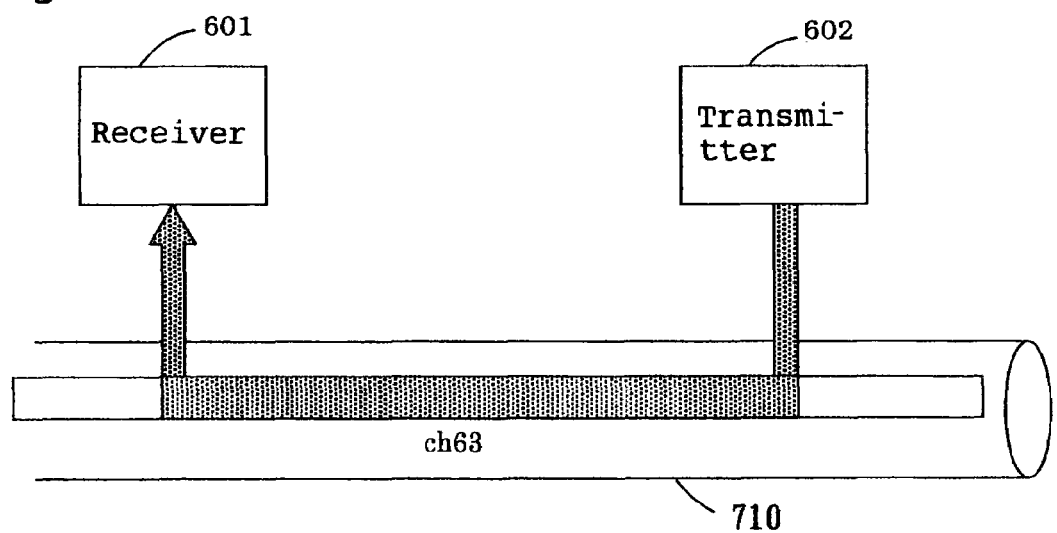
FIG. 22 is a conceptual view of point-to-point transmission in the IEC 61883.
Figure 23:
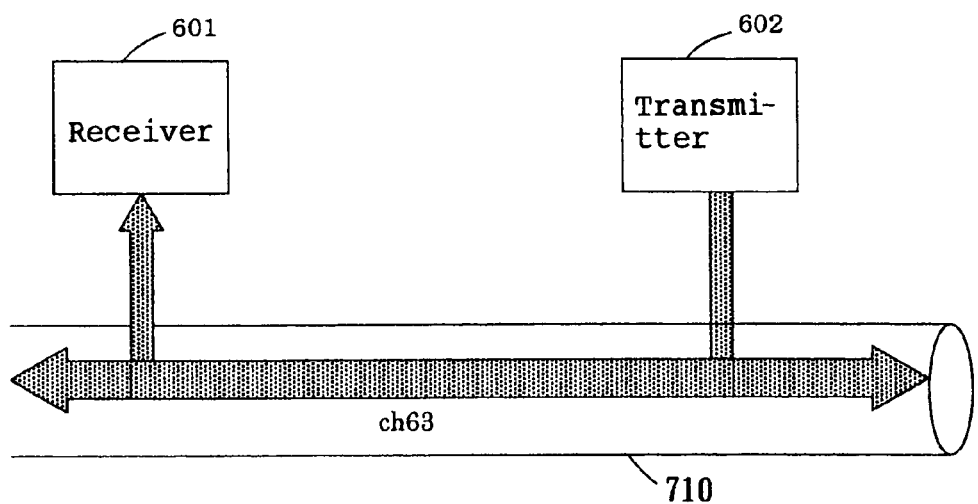
FIG. 23 is a conceptual view showing the condition that broadcast transmission and point-to-point transmission in the IEC 61883 are performed at the same time.

Then, in the embodiment described above, the data converting means 11, the auxiliary data file generating means 21, the data inverse converting means 31 and the auxiliary data file generating means 41 have been described as being contained in the PC 1 (equipment other than personal computers having similar functions may also be adopted), but the present invention can easily be implemented by other independent systems by realizing with a program the functions that the data converting means 11, the auxiliary data file generating means 21, the data inverse converting means 31 and the auxiliary data file generating means 41 have, and recording these functions in recording media such as floppy disks and transporting them. FIG. 16 describes the case where these functions are transported using a floppy disk.

FIG. 16(*a*) shows an example of a physical format of a floppy disk that is the main body of a recording medium. Tracks are formed like concentric circles from the outer perimeter towards the inner perimeter, and are divided into sixteen sectors in the direction of angle. A program is recorded in accordance with the areas assigned in this way.

FIG. 16(*b*) illustrates a case storing this floppy disk. From the left, a front view of the floppy disk, its sectional view and the floppy disk are shown, respectively. By storing the floppy disk in the case in this way, the disk can be protected from the dust and impact from the outside and transported completely.

FIG. 16(*c*) illustrates performing record/regeneration of the program to the floppy disk. As shown in the figure, by connecting a floppy disk drive to a computer system, record/regeneration of the program can be performed to the disk. The disk is inserted into and taken out of the floppy disk drive via an insertion slot. In case of recording, the computer system records the program in the disk using the floppy disk drive. In case of regeneration, the floppy disk drive reads the program from the disk, and transfers the program to the computer system.

Furthermore, in this embodiment, explanation has been presented using the floppy disk as a recording medium, but similar performance can also be achieved using an optical disk. Also, the recording medium is not limited to these disks, but media that can record a program, such as IC cards and ROM cassettes may be implemented in a similar way.

As described above, in this embodiment, a read request from the software 4 dealing with audio/video data via the software 6 managing the File is analyzed based on the header information and index information prepared in advance, and the data obtained by inserting the header information and index information in stream data is returned as read data, thereby allowing the software 4 dealing with audio/video data to make an access to even the stream data recorded in the stream data record/regeneration device as a file.

Also, it is made possible to generate the header information and index information needed for making data look like a file from the data regenerated by the stream data record/regeneration device 2, or the data accompanying a write request from the software 6 managing the file and prepare the information in the HDD 7 as a file.

Also, it is made possible to record as stream data in real time the data written asynchronously in a file format by extracting audio/video data from the data accompanying the write request from the software 4 dealing with audio/video data via the software 6 managing the file, and transferring the audio/video data in a batch when a predetermined amount is accumulated.

Embodiment 3

Now, a third embodiment will be described using FIG. 18 to FIG. 20 and FIG. 25 to FIG. 28.

The configuration and operations of the DV 702 are similar to those of the third prior art, and the configuration of the PC 701 is similar to that of the third prior art.

Furthermore, the DV 702 of this embodiment is an example of the data source of the present invention, the PC 701 of this embodiment is an example of the personal computer of the present invention, the driver 704 for DV, IEEE 1394 driver 705 of this embodiment is an example of device controlling means of the present invention.

The operations of the PC 701 will be described.

Upon receiving start-of-reception instructions as operation instructions 714 from the application 703, the driver 704 for DV sends a request to obtain the value of the oPCR[0] 708 of the DV 702 to the IEEE 1394 driver 705 as the request 715, first. The IEEE 1394 driver 705 requests the IEEE 1394 interface 709 to send the register data 717 in the oPCR[0] 708 through the IEEE 1394 interface 706. Upon receiving the send request, the IEEE 1394 interface 709 fetches the register data 717 from the oPCR[0] 708, and sends the same to the IEEE 1394 interface 706. The IEEE 1394 driver 705 outputs the register data 717 received by the IEEE 1394 interface 706 to the driver 704 for DV as a response 716.

The driver 704 for DV views the content of the register data 717, and if the bcc of the oPCR[0] 708 is 1, it does not establish the point-to-point connection to the DV 702, namely it sends a request to start receiving data directly from the value indicated by the channel number in the oPCR[0] 708, for example ch63 to the IEEE 1394 driver 705 as the request 715. Upon receiving the start-of-reception instructions as the request 715, the IEEE 1394 driver 705 starts receiving the isochronus packets that is data from the ch63 on the IEEE 1394 bus 710 through the IEEE 1394 interface 706.

Operations from then on are similar to those of the third prior art.

Operations in the case where the bcc of the oPCR[0] 708 is 0 are similar to those of the third prior art.

On the other hand, upon receiving stop-of-reception instructions as the operation instructions 714 from the application 703, the driver 704 for DV sends instructions to stop receiving data from the IEEE 1394 bus 710 to the IEEE 1394 interface 706 as the request 715, first. Upon receiving the stop-of-reception instructions, the IEEE 1394 interface 706 stops receiving data from the IEEE 1394 bus 710.

Next, if at the start of reception, 1 is added to the p2p in the oPCR[0] 708 to establish the point-to-point connection, the driver 704 for DV sends a request to obtain the value of the oPCR[0] 708 of the DV 702 to the IEEE 1394 driver 705 as the request 715. After that, the driver 704 for DV sends instructions to write the data obtained by assigning the value obtained by subtracting 1 from the value of the p2p in the oPCR[0] 708 to the p2p of the oPCR[0] 708 in the oPCR[0] 708 as new register data 717 to the IEEE 1394 driver 705 as the request 715. By similar operations to those described above, the value of the oPCR[0] 708 of the DV 702 is changed. If the bcc of the oPCR[0] 708 is 0, and the driver 704 for DV allocates the resource of the IEEE 1394 bus 710 earlier, then the driver 704 for DV releases the resource of the IEEE 1394 bus 710 at the same time. Then, the driver 704 for DV turns the value of the channel number of the oPCR[0] 708 back to the original value, if necessary.

If the point-to-point connection is not established to the DV 702 at the start of reception, the driver 704 for DV does nothing and terminates the process.

In the operations described above, tables describing the values of the oPCR[0] 708 of the DV 702 and who allocates the resource of the IEEE 1394 bus 710 and who releases the same are shown in FIG. 25 to FIG. 28 as one example.

As in the case of the third prior art, totally four operations are possible, considering which of start-of-regeneration of the DV 702 and start-of-reception of the PC 701 was performed earlier, and which of stop-of-regeneration of the DV 702 and stop-of-reception of the PC 701 was performed earlier.

FIG. 25 shows the case where the start of regeneration L of the DV 702 and the stop-of-reception of PC 701 are performed earlier. When the DV 702 starts regeneration, the DV 702 allocates the resource because the p2p is still 0, namely the point-to-point connection is not established yet.

When the PC 701 starts reception, the regeneration of the DV 702 is already started, and the bcc of oPCR[0] 708 is 1. Thus, the PC 701 does not change the channel number and the value of the p2p, and does not allocate the resource of the IEEE 1394 bus 710. That is, the point-to-point connection is not established and only the broadcast transmission is used.

When the PC 701 stops reception, the bcc of the oPCR[0] 708 is 1 because the DV 702 is still performing regeneration. Thus, the PC 701 does not need to release the resource of the IEEE 1394 bus 710.

When the DV 702 stops regeneration, the bcc is turned back to 0, but because the p2p also remains 0 and none of the connections is established, the DV 702 releases the resource of the IEEE 1394 bus 710.

FIG. 26 shows the case where the start of regeneration of the DV 702 and the stop of reception of the DV 702 are performed earlier. When the DV 702 starts regeneration, the DV 702 allocates the resource because the p2p is still o and the point-to-point connection is not established yet.

When the PC 701 starts reception, regeneration of the DV 702 is already started, and the bcc of the oPCR[0] 708 is 1. Thus, the PC 701 only changes the p2p of the oPCR[0] 708 to 1, neither changing the channel number nor securing the resource of the IEEE 1394 bus 710.

When the DV 702 stops regeneration, the DV 702 releases the resource because also the p2p is 0, namely the point-to-point connection is not established yet.

When the PC 701 starts reception, the DV 702 already releases the resource of the IEEE 1394 bus 710, and thus the PC 701 may simply stop reception.

Operations in the case where the start-of-reception is performed earlier are similar to the third prior art, which are shown in FIG. 27 and FIG. 28.

Thus, even in the case where the PC 701 can release resources allocated by it own but can not release resources allocated by other devices, as its characteristic, the resource of the IEEE 1394 bus 710 will be correctly allocated and released in any case, regardless of order of performing start/stop of reception of the PC 701 and start/stop of regeneration of the DV 702.

Furthermore, the value of the channel number written in the oPCR[0] 708 of the DV 702 as an initial condition has been described as ch63, but any integer number of 0 to 63 may be adopted.

Also, it has been described that the value of the channel number of the oPCR[0] 708 of the DV 702 is turned to ch0 when the point-to-point connection is established to the DV 702 by the PC 701, but any integer number of 0 to 63 may be adopted as long as the channel is not already allocated by another device.

Also, it has been described that the PC 701 and the DV 702 are connected on the IEEE 1394 bus 710, but another IEEE 1394 device may be connected.

Also, it has bee described that as an initial condition, the p2p of the oPCR[0] 708 of the DV 702 is 0, namely the DV 702 is not established with point-to-point connection with any other device, but the DV 702 may be established with point-to-point connection with another device as an initial condition.

Also, in this embodiment, operations of the PC 701 have been explained, but when a device that can release the resource allocated by a device other than the PC 701, i.e. another device receives data from the DV 702, the device may operate as in the case of the PC 701 of this embodiment, or the device may operate as in the case of the PC 701 described with the prior art.

Furthermore, a medium carrying a program and/or data for having all or a part of functions of all or a part of means of the data source, the conversion device, the auxiliary data file generation device, or the data inverse conversion device of the present invention executed by the computer, characterized in that the medium can be processed by the computer also belongs to the present invention.

Furthermore, an information aggregate characterized in that the information aggregate is a program and/or data for having all or a part of functions of all or a part of means of the data source, the conversion device, the auxiliary data file generation device, or the data inverse conversion device of the present invention executed by the computer also belongs to the present invention.

Furthermore, a medium carrying a program and/or data for having all or a part of operations of all or a part of steps of the data conversion method, the auxiliary data file generation method, the data inverse conversion method or the reception method of the present invention executed by the computer, characterized in that the medium can be processed by the computer also belongs to the present invention.

An information aggregate characterized in that the information aggregate is a program and/or data for having all or a part of operations of all or a part of steps of the data conversion method, the auxiliary data file generation method, the data inverse conversion method or the reception method of the present invention executed by the computer also belongs to the present invention.

Furthermore, the present invention is a medium carrying a program and/or data for having all or a part of functions of all or a part of means of the data source, the data conversion device, the auxiliary data file generation device or the data inverse conversion device of the present invention executed by the computer, wherein the above described program and/or data that can be read and has been read by the computer works together with the above described computer to execute the above described functions.

Furthermore, the present invention is a medium carrying a program and/or data for having all or a part of operations of all or a part of steps of the data conversion method, the auxiliary data file generation method, the data inverse conversion method or the reception method of the present invention executed by the computer, wherein the above described program and/or data that can be read and has been read by the computer works together with the above described computer to execute the above described operations.

The present invention is an information aggregate that is a program and/or data for having all or a part of functions of all or apart of means of the data source, the data conversion device, the auxiliary data file generation device or the data inverse conversion device of the present invention executed by the computer, wherein the above described program and/or data that can be read and has been read by the computer works together with the above described computer to execute the above described functions.

The present invention is an information aggregate that is a program and/or data for having all or a part of operations of all or a part of steps of the data conversion method, the auxiliary data file generation method, the data inverse conversion method or the reception method of the present invention executed by the computer, wherein the above described program and/or data that can be read and has been read by the computer works together with the above described computer to execute the above described operations.

Furthermore, the data of the present invention includes data structure, data format, data types and the like.

Furthermore, the medium of the present invention includes recording media such as ROM, transmission media such as internet and transmission media such as light, radio and acoustic waves and the like.

Furthermore, the carrying medium of the present invention includes recording media recording a program and/or data, and transmission media transmitting a program and/or data, for example.

Furthermore, "can be processed by the computer" according to the present invention includes "can be read by the computer" in the case of recording media such as ROM, and "a program and/or data to be transmitted can be treated as the result of transmission by the computer" in the case of transmission media, for example.

Furthermore, the information aggregate of the present invention includes software such as programs and/or data.

Furthermore, as described above, the configuration of the present invention may be implemented in terms of either software or hardware.

Apparent from what has been described above, the present invention may provide a data source, a medium and an information aggregate enabling the PC's memory amount used by the IEEE 1394 driver to be reduced even when the same number of frame buffers are used, by reducing the number of addresses to be stored in the FIFO.

Also, the present invention may provide a data conversion device, an auxiliary data file generation device, a data inverse conversion device, a data conversion method, an auxiliary data file generation method, a data inverse conversion method, a medium and am information aggregate that do not require a HDD of large capacity because it is possible to make a direct access from software dealing with audio/video data in arbitrary asynchronous timing directly to arbitrary data, and it is not necessary to perform very complicated processes and upload/download data to the HDD.

Also, the present invention may provide a reception method, a medium and an information aggregate that allow the data sink to perform reception using broadcast transmission instead of establishing the point-to-point connection in the case where the data source already performs send by broadcast transmission, thereby making it possible to release always correctly the resource of the IEEE 1394 at the end of data transmission.

What is claimed is:

1. A reception method, wherein in the case where a data sink conforming substantially with IEC 61883 and a data source conforming with IEC 61883 are connected to an IEEE 1394 bus, and
in the case where said data sink is a personal computer having an IEEE 1394 interface and device controlling means for controlling all or part of devices connected to said IEEE 1394 bus,
upon receiving start-of-reception instructions, said data sink determines whether said data source is outputting output data to said IEEE 1394 bus using broadcast transmission, and
in the case where said data source is outputting said output data to said IEEE 1394 bus using broadcast transmission,
said data sink starts receiving said output data without establishing a point-to-point connection to said data source and uses only the broadcast transmission to receive said output data.

2. The reception method according to claim 1, wherein said data source has an output control register,
said output control register includes a flag indicating whether broadcast transmission is performed and a channel number indicating which channel said output data is outputted to, and
in the case where said data sink is said personal computer,
said data sink determines by reading said flag whether said data source outputs said output data to said IEEE 1394 bus using broadcast transmission, and
in the case where said data source outputs said output data to said IEEE 1394 bus using broadcast transmission,
said data sink receives said output data from the channel for which said channel number is described without changing said channel number.

3. The reception method according to claim 1, wherein said data source has an output control register,
said output control register includes therein a flag indicating whether broadcast transmission is performed and a channel number indicating to which channel the output data is outputted, and
in the case where said data sink is said personal computer,
said data sink determines by reading said flag whether said data source outputs said output data to said IEEE 1394 bus using broadcast transmission, and
said data sink changes said channel number to an arbitrary value N (N is a integer between 0 and 63), followed by receiving said output data from a channel whose channel number is said N.

4. The reception method according to claim 2 or 3, wherein in the case where said data source does not output said output data to the IEEE 1394 bus,
in the case where said data sink is said personal computer,
after said data sink establishes a point-to-point connection to said data source, said data source starts outputting said output data to said IEEE 1394 bus, and at the same time said data sink receives said output data.

5. The reception method according to any one of claims 2 to 3, wherein a second data sink conforming to IEC 61883 is connected to said IEEE 1394 bus, and
in the case where said data source outputs said output data to said IEEE 1394 bus under the condition that said data source is established with or establishes a point-to-point connection to said second data sink, and without using broadcast transmission, and
in the case where said data sink is said personal computer, said data sink establishes a point-to-point connection to said data source, and receives said output data.

6. The reception method according to any one of claims 1 to 3, wherein said data source is a digital VCR for use at home.

7. The reception method according to any one of claims 1 to 3, wherein said data source is a set top box outputting MPEG data.

8. A medium carrying a program and data for executing the reception method according to any one of claims 1 to 3 executed by the computer, wherein said medium can be processed by a computer.

9. An information aggregate, wherein said information aggregate is a program and data for executing the reception method according to any one of claims 1 to 3 executed by a computer.

10. A medium that carries a program and data for executing the reception method according to any one of claims 1 to 3 executed by a computer, wherein said medium can be processed by the computer.

11. An information aggregate wherein said information aggregate is a program and data for executing the reception method according to any one of claims 1 to 3 executed by a computer.

* * * * *